(12) United States Patent
Kakitsuba

(10) Patent No.: US 11,144,260 B2
(45) Date of Patent: Oct. 12, 2021

(54) NON-TRANSITORY COMPUTER-READABLE RECORDING MEDIUM FOR INFORMATION PROCESSING APPARATUS, INFORMATION PROCESSING APPARATUS INCLUDING SAME, AND METHOD FOR OUTPUTTING PRINT DATA USING SAME

(71) Applicant: Brother Kogyo Kabushiki Kaisha, Nagoya (JP)

(72) Inventor: Ryota Kakitsuba, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/715,283

(22) Filed: Dec. 16, 2019

(65) Prior Publication Data
US 2020/0225890 A1      Jul. 16, 2020

(30) Foreign Application Priority Data

Jan. 11, 2019    (JP) .............................. JP2019-003639

(51) Int. Cl.
*G06F 3/12*    (2006.01)

(52) U.S. Cl.
CPC .......... *G06F 3/1225* (2013.01); *G06F 3/1204* (2013.01); *G06F 3/1205* (2013.01); *G06F 3/1231* (2013.01); *G06F 3/1285* (2013.01)

(58) Field of Classification Search
None
See application file for complete search history.

(56) References Cited

U.S. PATENT DOCUMENTS

| | | | | |
|---|---|---|---|---|
| 9,019,555 | B1* | 4/2015 | Chappell | G06F 3/125 358/1.2 |
| 2004/0056409 | A1* | 3/2004 | Kawata | B42C 19/08 271/9.01 |
| 2004/0189777 | A1* | 9/2004 | Sugiura | B41J 11/06 347/104 |
| 2007/0236728 | A1* | 10/2007 | Kobayashi | G06F 3/1253 358/1.15 |
| 2008/0292329 | A1* | 11/2008 | Kimoto | G03G 15/5087 399/17 |

(Continued)

FOREIGN PATENT DOCUMENTS

JP       H09-188007 A       7/1997

*Primary Examiner* — Miya J Williams
(74) *Attorney, Agent, or Firm* — Burr & Brown, PLLC

(57) ABSTRACT

A non-transitory computer-readable recoding medium for an information processing apparatus stores instructions realizing a computer program. The program is installed in the information processing apparatus using printer model information coinciding with connected printer information indicating a model of the printer and sheet type information indicating the sheet selected by a user. The program causes, when executed by the controller, the information processing apparatus to determine, from among a plurality of pieces of display information, one piece of the plurality of pieces of display information which is associated with the printer model information and the sheet type information used to install the program as determined display information to be displayed, obtain image data, generate print data based on the obtained image data, output the generated print data and output the determined display information.

17 Claims, 10 Drawing Sheets

(56) References Cited

U.S. PATENT DOCUMENTS

2015/0248259 A1* 9/2015 Kumagai .......... G06K 15/1805
　　　　　　　　　　　　　　　　　　　　358/1.13
2019/0286385 A1* 9/2019 Minegishi ............. G06F 3/1276

* cited by examiner

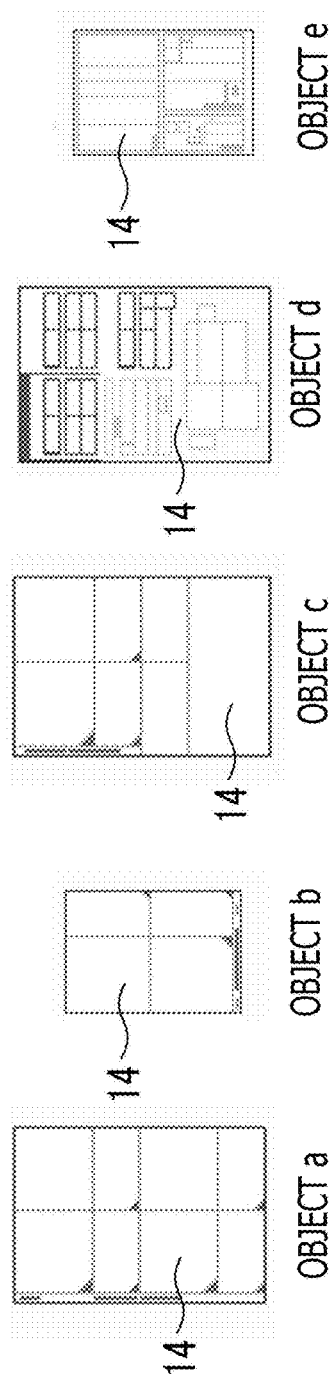
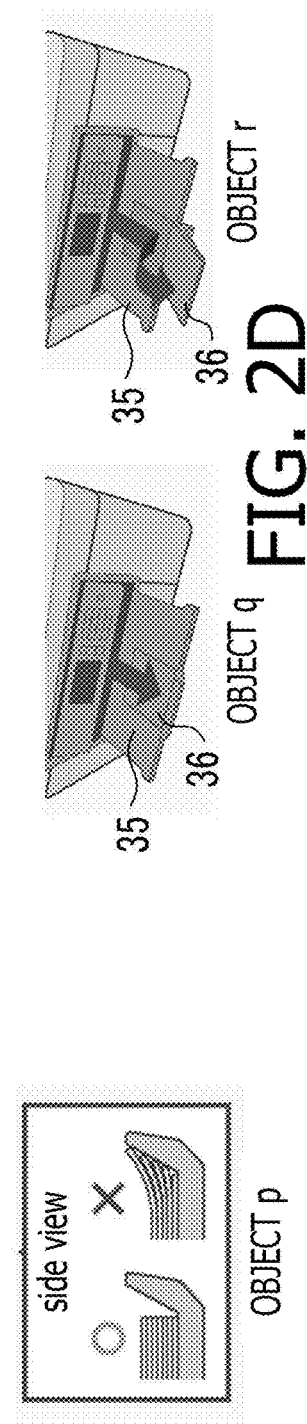
FIG. 2A
FIG. 2B
FIG. 2C
FIG. 2D

FIFTH DISPLAY SCREEN

SIXTH DISPLAY SCREEN

NON-TRANSITORY COMPUTER-READABLE RECORDING MEDIUM FOR INFORMATION PROCESSING APPARATUS, INFORMATION PROCESSING APPARATUS INCLUDING SAME, AND METHOD FOR OUTPUTTING PRINT DATA USING SAME

CROSS-REFERENCE TO RELATED APPLICATIONS

This application claims priority under 35 U.S.C. § 119 from Japanese Patent Application No. 2019-003639 filed on Jan. 11, 2019. The entire subject matter of the application is incorporated herein by reference.

BACKGROUND

Technical Field

The present disclosures relate to a print data outputting method, an information processing apparatus using the print data outputting method, a non-transitory computer-readable recording medium storing instructions realizing a program which causes the information processing apparatus of output print data and an installer configured to install such a program in the information processing apparatus.

Related Art

There has been known a program which is installed in an information processing apparatus such as a personal computer and causes the information processing apparatus to convert received image data to print data such as PDL (page description language) data and output the print data to a printer. Such a program is typically known as a printer driver.

With use of the printer driver, a user can make various settings such a size of sheets, a type of the sheet (e.g., a normal sheet or a glossy sheet), a printing method (e.g., a one-side printing or a both-side printing), a size of margins and the like.

SUMMARY

In order to enable the user to make such print settings easily, a print control program has conventionally been used. Typically, the print control program has a setting management table in which user-defined names, driver names and parameters related to printing (i.e., print settings) have been registered in an associated manner. The user can cause the printer driver to output print data with the print settings registered in the setting management table simply by selecting one of the user-definition names.

According to the conventional technique as described above, the user can make the print settings easily. However, when a certain operation of the printer is necessary in order to perform the printing operation, the conventional technique described above does not provide a solution.

According to aspects of the present disclosures, there is provided a non-transitory computer-readable recoding medium for an information processing apparatus connected to a printer, the recording medium storing instructions realizing a computer program to be executed by a controller of the information processing apparatus, the program including a plurality of pieces of display information associated with a plurality of pieces of printer model information respectively indicating models of a plurality of printers and a plurality of pieces of sheet type information respectively indicating a plurality of types of sheets, the printer having a tray on which the sheet is placed, the display information includes information on handing of the tray and the sheet. The program is installed in the information processing apparatus using one of the plurality of pieces of the printer model information coinciding with connected printer information indicating a model of the printer connected to the information processing apparatus and one of the plurality of pieces of sheet type information selected by a user from among the plurality of pieces sheet type information. The program causes, when executed by the controller, the information processing apparatus to perform a determining process of determining, from among a plurality of pieces of display information, one piece of the plurality of pieces of display information which is associated with the printer model information and the sheet type information used to install the program as determined display information to be displayed, an image data obtaining process of obtaining image data, a generating process of generating print data based on the obtained image data, a data outputting process of outputting the generated print data, and a display information outputting process of outputting the determined display information.

According to aspects of the present disclosures, there is provided a non-transitory computer-readable recoding medium for information processing apparatus connected to a printer, the recording medium storing instructions realizing an installer set including a program to be executed by a controller of the information processing apparatus to control the information processing apparatus and an installer configured to install the program in the information processing apparatus. The program includes a plurality of pieces of display information associated with a plurality of pieces of printer model information respectively indicating models of a plurality of printers and a plurality of pieces of sheet type information respectively indicating a plurality of types sheets, the printer having a tray on which the sheet is placed, the display information includes information on handing of the tray and the sheet. The installer causes, when executed by the controller, the information processing apparatus to perform a receiving process of receiving a user selection to select sheet type information from among a plurality of pieces sheet type information, a connected printer information obtaining information obtaining process of obtaining a name of the connected printer, a storing process of storing the sheet type information selected by the user and the printer model information coinciding with the obtained connected printer information in a memory of the information processing apparatus, and an installing process of installing the program using the printer model information and the sheet type information stored in the memory. The program causing, when executed by the controller, the information processing apparatus to perform a determining process of determining, from among a plurality of pieces of display information, display information associated with the printer model information and the sheet type information used to install the program as determined display information to be displayed, an image data obtaining process of obtaining image data, a generating process of generating print data based on the obtained image data, a data outputting process of outputting the generated print data, and a display information outputting process of outputting the determined display information.

According to aspects of the present disclosures, there is provided an information processing apparatus which is provided with an inputting device configured to receive a user operation, a communication device, a memory device and a controller. The memory stores a plurality of pieces of display information associated with a plurality of pieces of printer model information respectively indicating a plurality of printer models and a plurality of pieces of sheet type information respectively indicating a type of sheets used in a printer, the printer having a tray on which sheets are to be placed, the display information being information indicating handling of the tray and the sheet. The controller is configured to perform obtaining connected printer information indicating a model of the printer connected to the communication device, receiving a user operation to select one piece of sheet type information from among a plurality of pieces of sheet type information, storing the printer model information coinciding with the obtained connected printer information and the received sheet type information in the memory, determining the display information associated with the printer model information and the display information stored in the memory as the determined display information, obtaining image data, generating print data based on the obtained image data, outputting the generated print data to the printer through the communication device, and outputting the determined display information.

According to aspects of the present disclosures, there is provided a method for an information processing apparatus provided with an inputting device configured to receive a user operation, a communication device, a memory. The memory stores a plurality of pieces of display information associated with a plurality of pieces of printer model information respectively indicating a plurality of printer models and a plurality of pieces of sheet type information respectively indicating a type of sheets used in a printer. The printer has a tray on which sheets are to be placed. The display information is information indicating handling of the tray and the sheet. The method includes obtaining connected printer information indicating a model of the printer connected to the communication device, receiving a user operation to select one piece of sheet type information from among a plurality of pieces of sheet type information, storing the printer model information coinciding with the obtained connected printer information and the received sheet type information in the memory, determining the display information associated with the printer model information and the display information stored in the memory as the determined display information, obtaining image data, generating print data based on the obtained image data, outputting the generated print data to the printer through the communication device, and outputting the determined display information.

BRIEF DESCRIPTION OF THE ACCOMPANYING DRAWINGS

FIG. 1 a block diagram schematically illustrating configurations of a printer and an information processing apparatus according to aspects of the present disclosures.

FIG. 2A is a table showing a relationship between 5 sheet names and object names.

FIG. 2B schematically shows images corresponding to respective object names.

FIG. 2C shows an image corresponding to an object p.

FIG. 2D shows images corresponding to objects q and r, respectively.

DETAILED DESCRIPTION OF EMBODIMENT

Figure 1:
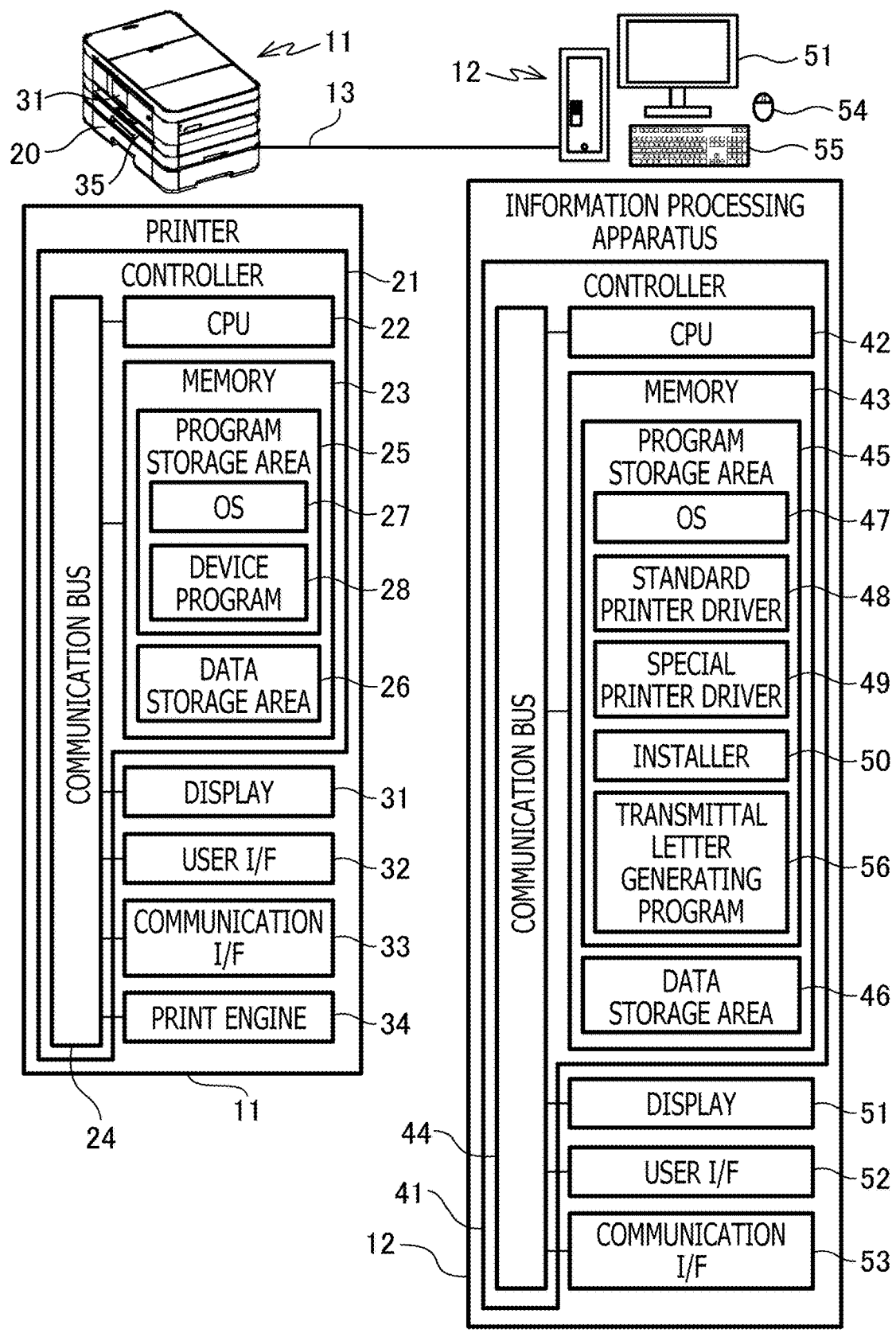

Hereinafter, referring to the accompanying drawings, an embodiment according to aspects of the present disclosures will be described. It should be noted that an embodiment described below is only an example according to aspects of the present disclosures. Various modifications and improvements of the embodiment can be made without departing from aspects of the present disclosures. For example, as a modification, an execution of order of processes, which will be described below, may be changed without departing aspects of the present disclosures.

According to the present embodiment, a special printer driver 49 is installed in an information processing apparatus 12. The special printer driver 49 is a program which, when executed, converts image data to print data and outputs the print data. Specifically, the special printer driver 49 is a program causing the printer 11 to print addresses and recipients on transmittal letter sheets 14 (see FIG. 2B) designated by transport firms. It is noted that the transmittal letter sheets 14 are examples of a sheet. Further, the special printer driver 49 is an example of a program. According to the configuration shown in FIG. 1, programs including the special printer driver 49 are stored in a memory 43, which is an example of a non-transitory computer-readable recoding medium.

The printer 11 is configured to feed sheets placed on a tray 20 one by one, and print an image on the sheet which is being fed inside the printer 11. For example, the printer 11 may be a so-called inkjet printer configured to eject ink droplets onto the sheet to perform printing. Alternatively, the printer 11 may be a so-called laser beam printer configured to transfer a toner image, which is formed on a photosensitive drum, onto the sheet and fix the transferred toner image on the sheet. Further alternatively, the printer 11 may be a so-called thermal printer configured to print an image on the sheet with use of film ink. In FIG. 1, the inkjet printer is shown as the printer 11. The printer 11 is configured to print an image on any of various sizes (e.g., A4 size, A5 size and the like) of sheets, and the sheets may be any of various types (e.g., normal sheets, glossy sheet and the like).

The information processing apparatus 12 could be a personal computer, a tablet or a mobile terminal. In FIG. 1, a personal computer is shown as an example of the information processing apparatus 12.

The printer 11 and the information processing apparatus 12 are communicably connected with each other through a communication cable 13 which could be a USB cable, a LAN cable or the like. It is noted that the printer 11 and the information processing apparatus 12 may be communicably connected through a wireless LAN or Wi-Fi®.

Next, referring to FIG. 1, configurations of the printer 11 and the information processing apparatus 12 will be described.

The printer 11 is provided with a display 31, a user I/F 32, a communication I/F 33, a print engine 34 and a controller 21.

The display 31 has a display panel and a touch sensor. The display panel may be an liquid crystal display, an organic EL (electroluminescent) display or the like. The touch sensor is formed to be a transparent film and overlaid on the display panel. That is, the display 31 is configured as a touch panel. The touch sensor is configured to output position information indicating a position, on the display panel, touched by the user. The display 31 is an example of a displaying device and an inputting device.

The user I/F 32 is, for example, an operation panel provided with a plurality of operation buttons. The user I/F 32 is an example of an inputting device. It is noted that only one of the touch sensor of the display 31 and the user I/F 32 may be provided to the printer 11.

The communication I/F 33 is configured to be connected to the communication cable 13. The communication I/F 33 receives/transmits information/data from/to the information processing apparatus through the communication cable 13.

The print engine 34 has, for example, a feed roller, a conveying roller, a discharge roller, a print head, a plurality of guide members and a discharge tray 35. The plurality of guide members are configured to define a sheet passage of the sheet which is conveyed inside the printer 11. The feed roller is configured to pick up the sheets placed on the tray 20 one by one. The conveying roller is configured to convey the sheet, which was introduced in the sheet passage by the feed roller, in the sheet passage. The print head is configured to print an image on the sheet which is being conveyed by the conveying roller. The discharge roller is configured to discharge the sheet bearing a printed image onto the discharge tray 35. It is noted that the print engine 34 need not be limited to have the above configuration. As far as the print engine 34 is configured to print an image on the sheet, which is picked up from the tray 20 and is being conveyed in the sheet passage, the print engine could be of any other configuration.

The controller 21 is configured to display objects (e.g., character strings, icons, operation buttons, links, radio buttons, check boxes, pulldown menus and the like) on the display. The controller 21 is also configured to control the print engine 34 to perform printing on the sheets. Further, the controller 21 is configured to communicate with the information processing apparatus 12 through the communication I/F 33. Still further, the controller 21 is configured to receive user operations through the user I/F 32.

The controller 21 is provided with a CPU 22, a memory 23 and a communication bus 24. The CPU 22 and the memory 23 are connected to the communication bus 24. The communication bus 24 is connected with the display 31, the user I/F 32, the communication I/F 33 and the print engine 34. In other words, the CPU 22 is connected to the display 31, the user I/F 32, the communication I/F 33 and the print engine 34 through the communication bus 24.

The memory 23 includes, for example, an RAM, a ROM, an EEPROM, an HDD, a portable recoding medium (e.g., a USB memory) which is detachably attached to the printer, a buffer of the CPU 22 or a combination of some of or all of the above.

The memory 23 has a program storage area 25 and a data storage area 26. The program storage area 25 stores an operating system (OS) 27 and a device program 28.

The device program 28 may be a single program or an aggregation of multiple programs. The device program 28 includes, for example, a UI module configured to receive input operations of the user, a communication module configured to communicate with another device such as the information processing apparatus 12 through the communication I/F 33, and a print module configured to control operations of the print engine 34. The multiple programs, or program modules are executed by the CPU 22 spuriously in parallel using a multitasking function.

The data storage area 26 stores data/information which is necessary for execution of the OS 27 and/or device program 28. The data storage area 26 further stores MIB (Management Information Base) information. The MIB information includes information of a model name indicating a mode of the printer 11 and information of an IP address assigned to the printer 11. In response to receipt of a command, through the communication I/F 33, from the information processing apparatus 12, the device program 28 returns the MIB information to the information processing apparatus 12 through the communication I/F 33. It is noted that the OS 47 of the information processing apparatus 12 stores a port name and the model name of the printer 11, in an associated manner, in a data storage area 46 of the memory 43. It is noted that the model name stored in the memory 43 of the information processing apparatus 12 is an example of connected printer information.

The information processing apparatus 12 is provided with a display device 51, a user I/F 52, a communication I/F 53 and a controller 41. A configuration of the communication I/F 53 is the same as that of the communication I/F 33 of the printer 11.

A mouse 54 and a keyboard 55 are connected to the user I/F 52. The user I/F 52 receives input of operation signals from the mouse 54 and/or keyboard 55 through an RS232C communication protocol. It is noted that the mouse 54 and the keyboard 55 are examples of an inputting device.

The display 51 has a display panel which may be an LCD or organic EL display. The display 51 displays an image of a pointer (e.g., an image of an arrow) which moves on the display panel in accordance with a movement of the mouse 54 operated by the user. When a left button of the mouse 54 is depressed with the pointer being overlaid on an object displayed on the display 51, the object is selected. It is noted that the display 51 is an example of a displaying device.

The controller 41 has a CPU 42, a memory 43 and a communication bus 44. The CPU 42 and the memory 43 are connected to the communication bus 44. The communication bus 44 is connected with the display 51, the user I/F 52 and the communication I/F 53. It is noted that the CPU 42 is an example of a computer.

The memory 43 has a program storage area 45 and the data storage area 46. The program storage area 45 stores an operating system (OS) 47, a standard printer driver (hereinafter, referred to as a standard driver) 48, a special printer driver (hereinafter, referred to as a special driver) 49, an installer 50 and a transmittal letter generating program 56. It is noted that the special driver 49 and the installer 50 are an example of an installer set.

The standard driver 48 is a printer driver designed to be used for general sheets (e.g., normal sheets, glossy sheets and the like) except for the transmittal letter sheet 14 (see FIG. 2B). The standard driver 48 converts, in accordance with print settings made by the user, input image data to print data having a format with which the printer 11 can perform printing, and the standard driver 48 outputs the same to the printer 11. The print settings include, for example, a sheet size, a type of the sheet (e.g., the normal sheet, the glossy sheet and the like), an N-up setting (e.g., 2-in-1 setting), a color/monochromatic setting, a one-side/both-side print setting, a margin size setting and the like.

There are multiple printers 11 of different models. For one model of the printer 11, one standard driver 48 is provided by the vender of the printer 11 so that the user can make use of the same. For example, for a model name "MFP-A" (see FIG. 3A) of the printer 11, a first standard driver 48 is provided to the user, and for a model name "MFP-B" (see FIG. 3A) of the printer 11, a second standard driver 48 is provided to the user. The user obtains the standard driver 48 corresponding to the model name of the printer 11 which is connected or is to be connected to the information processing apparatus 12, and installs the same in the information processing apparatus 12. It is noted that the user may obtain the standard driver 48 typically by downloading the same from a web page published by the vender through the Internet.

The special driver 49 is a printer driver particularly corresponding to the transmittal letter sheet 14. Different from the standard driver 48, the special driver 49 can be installed to any of a plurality of models of printers 11. For example, the special driver 49 can be installed to the printer 11 of which model name is "MFP-A" and can also be installed to the printer 11 of which model name is "MFP-B."

The special driver 49 is, different from the standard driver 48, a driver which is installed only for one kind of the sheets, namely, the transmittal letter sheet 14. With the standard driver 48, the user can select any of a plurality of types of sheets (e.g., the A4 size sheets, the A5 size sheets, the B4 size sheets, the B5 size sheet and the like). In contrast, with the special driver 49, the user does not need to select the type of the sheet once the special driver 49 is installed. In summary, the special driver 49 is a printer driver which can be installed to any of a plurality of models of printers 11 and used for only a single type of sheet. As will be described in detail below, the type of the sheet used by the special driver 49 is selected by the user when the special driver 49 is installed.

Figures 3A, 3B:
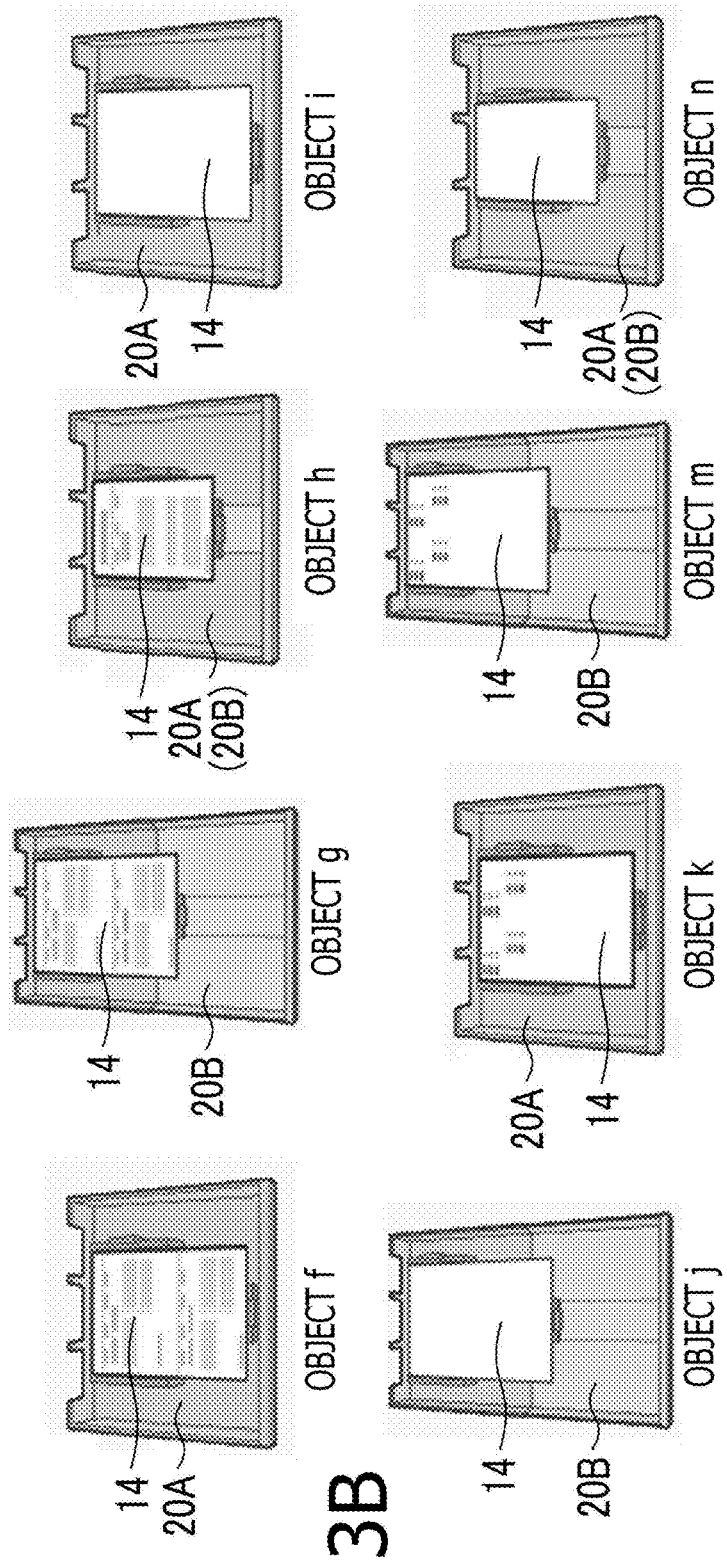
FIG. 3A is a table showing a relationship among the transmittal letter sheet names, model names and object data names.
FIG. 3B shows images corresponding to objects f, g, h, I, j, k, m and n, respectively.

The special driver 49 includes a first table shown in FIG. 2A and a second table shown in FIG. 3A.

The first table shown in FIG. 2A includes correspondence of transmittal letter sheet names which indicate types of the transmittal letter sheets and object names which indicates types of the objects. In an example shown in FIG. 2A, the transmittal letter sheet name "FIRST TRANSPORT FIRM A4" and the object name "OBJECT a" are associated with each other. An object a, an object b, an object c, an object d and an object e, which are identified by the object names are associated with respective pieces of image data representing images of the transmittal letter sheets 14 as shown in FIG. 2A. It is noted that the transmittal letter sheet names are examples of a sheet type information.

As shown in FIG. 2B, the image data associated with the object a indicates an image of the transmittal letter sheet of which name is "FIRST TRANSPORT FIRM A4." The image data associated with the object b indicates an image of the transmittal letter sheet of which name is "FIRST TRANSPORT FIRM A5." The image data associated with the object c indicates an image of the transmittal letter sheet of which name is "FIRST TRANSPORT FIRM YES A4." The image data associated with the object d indicates an image of the transmittal letter sheet of which name is "SECOND TRANSPORT FIRM A4." The image data associated with the object e indicates an image of the transmittal letter sheet of which name is "SECOND TRANSPORT FIRM A5." A plurality of pieces of image data respectively associated with the "object a" through the "object e" are examples of a second image data. Images of the transmittal letter sheets 14 indicated by the plurality of pieces of image data respectively associated with the "object a" through "object e" are examples of a second image.

The image of the transmittal letter sheet 14 included in the special driver 49 is displayed on the display 51 of the information processing apparatus 12 in order to prevent the user from inadvertently placing a wrong type of transmittal letter sheets on the tray 20.

The second table shown in FIG. 3A indicates correspondence among transmittal letter sheet names indicating the types of the transmittal letter sheets 14, model names indicating the models of the printers 11 and object data names indicating the types of the objects. In the example shown in FIG. 3A, for example, the transmittal letter sheet name "FIRST TRANSPORT FIRM A4," the model name "MFP-A" and the object data name "OBJECT DATA f" are associated with each other. It is noted that the "OBJECT DATA g," "OBJECT DATA h," "OBJECT DATA i," "OBJECT DATA j," "OBJECT DATA k," "OBJECT DATA l," "OBJECT DATA m" and "OBJECT DATA n" are associated with the image data indicating images showing the trays 20 on which the transmittal letter sheets 14 are placed in different manners, respectively. The model names of the printers 11 shown in the second table are examples of printer model information.

Configurations of the trays 20 for the printers 11 will be described in detail. The configurations of the trays 20 are different depending on the models of the printers 11. In the following description, the configurations of the trays 20 for the model of which name is "MFP-A" and the model of which name is "MFP-B" (see FIG. 3A) will be described. In the following description, the tray 20 of the printer 11 which is identified by the model name of "MFP-A" will be referred to as a tray 20A, and the tray 20 of the printer 11 which is identified by the model name of "MFP-B" will be referred to as a tray 20B.

Firstly, the tray 20B will be described with reference to an image of the tray 20B represented by image data associated with the object name "OBJECT h" and an image of the tray 20B represented by image data associated with the object name "OBJECT g." The tray 20B is configured to have a retracted state and an expanded state (see "OBJECT h" and "OBJECT g" in FIG. 3B). The image associated with the object name of "OBJECT h" shows the tray 20B in the retracted state, while the image associated with the object name of "OBJECT g" shows the tray 20B in the expanded state. For example, the tray 20B has a fixed part and a slidable part which is slidable with respect to the fixed part. As the user slides the slidable part of the tray 20B, the state of the tray 20B changes between the retracted part and the expanded part.

In the following description, the name of the object is indicated by enclosing an object name within double quotation marks, while an object itself is indicate by the object name without the double quotation marks. For example, "OBJECT h" is an object name corresponding to an image, and the image itself is referred to as an object h. In other words, "OBJECT h" is a name of the object h, and according to the present embodiment, the object h is an image. Thus, FIG. 3B shows eight objects f, g, h, I, j, k m and n (i.e., eight images), of which object names are "OBJECT f," "OBJECT g," "OBJECT h," "OBJECT i," "OBJECT j," "OBJECT k," "OBJECT m" and "OBJECT n," respectively.

The tray 20B shown as the object h in FIG. 3B is in the retracted state, and is configured to support A5 size transmittal letter sheets 14. The tray 20B shown as the object g in FIG. 3B is in the expanded state, and is configured to support A4 size transmittal letter sheets 14. In other words, when the transmittal letter sheets 14 placed on the tray 20B are of the A5 size, the tray 20B is to be set to the retracted state. Further, when the transmittal letter sheets 14 placed on the tray 20B are of the A4 size, the tray 20B is to be set to the expanded state.

Concretely, the length, in a longitudinal direction, of the A4 size transmittal letter sheet 14 is longer than a length, in the longitudinal direction, of the tray 20B in the retracted state and shorter than that of the tray 20B in the expanded state. Further, the length, in the longitudinal direction, of the A5 size transmittal letter sheet 14 is shorter than the length, in the longitudinal direction, of the tray 20B in the retracted state. Accordingly, the tray 20 in the expanded state is capable of fully supporting the A4 size transmittal letter sheets 14. Further, the tray 20 in the retracted state is capable of fully supporting the A5 size transmittal letter sheets 14. The tray 20B is set, by the user, to be in the retracted state of the expanded state depending on the size of the transmittal letter sheets 14 placed on the tray 20B. It is noted that the term "longitudinal" is used to indicate an up-down direction in FIG. 2B and FIG. 3B.

It is noted that the retracted state is an example of a first state. The A5 size transmittal letter sheet 14 is an example of one type of sheet. The expanded state is an example of a second state. The A4 size transmittal letter sheet 14 is an example of another type of sheet. It is noted that the first state and the second state need not be limited to the retracted state and the expanded state, respectively. Further, an example of an operation to switch between the retracted state and the expanded state need not be limited to the sliding operation. For example, the status of the tray 20B may be changed as the user attach an auxiliary member such as an auxiliary plate or an auxiliary stick for supporting a part of the transmittal letter sheet 14 to the tray 20B. In such a case, the state of the tray 20B before the auxiliary member is attached is an example of the first state, while the state of the tray 20B after the auxiliary member has been attached is an example of the second state. Optionally, the auxiliary member may not be detachably attached, but may be slidably or rotatably provided to the tray 20B.

An orientation of the transmittal letter sheets 14 which are to be placed on the tray 20 was determined when the printer 11 was designed. Specifically, the transmittal letter sheet 14 includes a printing layer formed by printing sheet on which an image (i.e., figures, letters and the like) is printed, an adhesion layer formed of adhesive agent and a release layer formed of releasing paper. Specifically, the adhesion layer is arranged below the printing layer, and the release layer is arranged below the adhesion layer. Since the transmittal letter sheet 14 has the adhesion layer, if there occurs a paper jam inside the printer 11 and the release paper is released from the adhesion layer due to the paper jam, the adhesive agent may be adhered onto the conveying roller or the discharge roller of the printer 11. In such a case, it would be troublesome to remove the transmittal letter sheet 14 causing the paper jam from the printer 11. Further, when the paper jam has occurred and the transmittal letter sheet 14 which has caused the paper jam has been removed from the printer 11, the adhesive agent remaining adhered onto the conveying roller and/or discharge roller may be an obstacle to the following printing operations.

The orientation of the transmittal letter sheet 14 in the tray 20B affects occurrence of the paper jam. Therefore, at a time of designing of the printer 11, the orientation of the transmittal letter sheet 14 with respect to the tray 20B is determined so that the transmittal letter sheet 14 may hardly cause the paper jam. In each of the examples shown in FIG. 3B, the transmittal letter sheet 14 is placed longitudinally on the tray 20B. It is noted that the printer 11 may be designed such that, even if the size thereof is the A4 size, when the sheets are not the transmittal letter sheets 14 but the normal sheets or the glossy sheets, the sheets are to be placed laterally on the tray 20. When the printer 11 is designed in such a manner, the user may inadvertently place the transmittal letter sheets 14 laterally (i.e., in the same orientation as the normal sheets of the glossy sheets). The special driver 49 is configured to suppress the transmittal letter sheet 14 being placed on the tray 20 in a wrong orientation (e.g., the same orientation as the normal sheets) by displaying one of screens shown in FIGS. 7A-10B on the display 51.

Next, the tray 20A which is the tray 20 for the printer 11 of which model name is "MFP-A" will be described. The length of the tray 20A in the longitudinal direction is longer than the length of the tray 20B in the longitudinal direction and longer than the length, in the longitudinal direction, of the A4 size sheets. Thus, the tray 20A is capable of supporting the entire length, in the longitudinal direction, of the A4 size transmittal letter sheet 14 without being expanded. It is noted that the tray 20A may be configured to be deformable between the retracted state and the expanded state, or may not have such a configuration.

As shown in FIG. 3B, an image represented by the image data associated with the object name "OBJECT f" (i.e., the object f) shows the tray 20A of the printer 11 of which model name is "MFP-A" and the transmittal letter sheets 14 for the first transport firm A4 are placed thereon. The image represented by the image data associated with the object name "OBJECT f" (i.e., the object f) indicates a position of the transmittal letter sheets 14 for the first transport firm A4 on the tray 20A, an orientation in a horizontal direction of the transmittal letter sheets 14, and whether the transmittal letter sheets 14 are to be placed face-up or face-down.

An image represented by the image data associated with the object name "OBJECT g" (i.e., the object g) shows the tray 20B of the printer 11 of which model name is "MFP-B" and the transmittal letter sheets 14 for the first transport firm A4 are placed thereon. The image represented by the image data associated with the object name "OBJECT g" (i.e., the object g) indicates a position of the transmittal letter sheets 14 for the first transport firm A4 on the tray 20B, an orientation in a horizontal direction of the transmittal letter sheets 14, and whether the transmittal letter sheets 14 are to be placed face-up or face-down.

An image represented by the image data associated with the object name "OBJECT h" (i.e., the object h) shows the tray 20A or 20B of the printer 11 of which name is "MFP-A" or "MFP-B" and the transmittal letter sheets 14 for the first transport firm A5 are placed thereon. The image represented by the image data associated with the object name "OBJECT h" (i.e., the object h) indicates a position of the transmittal letter sheets 14 for the first transport firm A5 on the tray 20A or 20B, an orientation in a horizontal direction of the transmittal letter sheets 14, and whether the transmittal letter sheets 14 are to be placed face-up or face-down.

An image represented by the image data associated with the object name "OBJECT i" (i.e., the object i) shows the tray 20A of the printer 11 of which model name is "MFP-A" and the transmittal letter sheets 14 for the first transport firm YesA4 are placed thereon. The image represented by the image data associated with the object name "OBJECT i" (i.e., the object i) indicates a position of the transmittal letter sheets 14 for the first transport firm YesA4 on the tray 20A, an orientation in a horizontal direction of the transmittal letter sheets 14, and whether the transmittal letter sheets 14 are to be placed face-up or face-down.

An image represented by the image data associated with the object name "OBJECT j" (i.e., the object j) shows the tray 20B of the printer 11 of which name is "MFP-B" and the transmittal letter sheets 14 for the first transport firm YesA4 are placed thereon. The image represented by the image data associated with the object name "OBJECT j" (i.e., the object j) indicates a position of the transmittal letter sheets 14 for the first transport firm YesA4 on the tray 20B, an orientation in a horizontal direction of the transmittal letter sheets 14, and whether the transmittal letter sheets 14 are to be placed face-up or face-down.

An image represented by the image data associated with the object name "OBJECT k" (i.e., the object k) shows the tray 20A of the printer 11 of which model name is "MFP-A" and the transmittal letter sheets 14 for the second transport firm A4 are placed thereon. The image represented by the image data associated with the object name "OBJECT k" (i.e., the object k) indicates a position of the transmittal letter sheets 14 for the second transport firm A4 on the tray 20A, an orientation in a horizontal direction of the transmittal letter sheets 14, and whether the transmittal letter sheets 14 are to be placed face-up or face-down.

An image represented by the image data associated with the object name "OBJECT m" (i.e., the object m) shows the tray 20B of the printer 11 of which name is "MFP-B" and the transmittal letter sheets 14 for the second transport firm A4 are placed thereon. The image represented by the image data associated with the object name "OBJECT m" (i.e., the object m) indicates a position of the k sheets 14 for the second transport firm A4 on the tray 20B, an orientation in a horizontal direction of the transmittal letter sheets 14, and whether the transmittal letter sheets 14 are to be placed face-up or face-down.

An image represented by the image data associated with the object name "OBJECT n" (i.e., the object n) shows the tray 20A or 20B of the printer 11 of which name is "MFP-A" of "MFP-B" and the transmittal letter sheets 14 for the second transport firm A5 are placed thereon. The image represented by the image data associated with the object name "OBJECT n" (i.e., the object n) indicates a position of the transmittal letter sheets 14 for the second transport firm A5 on the tray 20A or 20B, an orientation in a horizontal direction of the transmittal letter sheets 14, and whether the transmittal letter sheets 14 are to be placed face-up or face-down.

It is noted that respective pieces of image data which are associated with the object names "OBJECT f"—"OBJECT n" are examples of display information and first image data. The images represented by the respective pieces of image data associated with the object names "OBJECT f"—"OBJECT n" (i.e., the objects f-n) are examples of a first image. Further, the respective pieces of image data which are associated with the object names "OBJECT f"—"OBJECT n" are examples of information indicating an orientation, in the horizontal direction, on the tray 20, information indicating a position on the tray, and information indicating whether the transmittal letter sheets 14 are placed, on the tray, face-up or face-down.

The image of the transmittal letter sheet 14 represented by the above-mentioned image data included in the special driver 49 is displayed on the display 51 of the information processing apparatus 12 so that the user does not place a wrong type of transmittal letter sheet on the tray 20 by mistake.

Further, the special driver 49 includes a plurality of pieces of character string data respectively indicating a plurality of character strings. For example, the plurality of pieces of character string data indicates, as shown in FIGS. 7A-10B, first through fifth character strings. Each of the first through fifth character strings will be described in detail below.

Figure 7A:
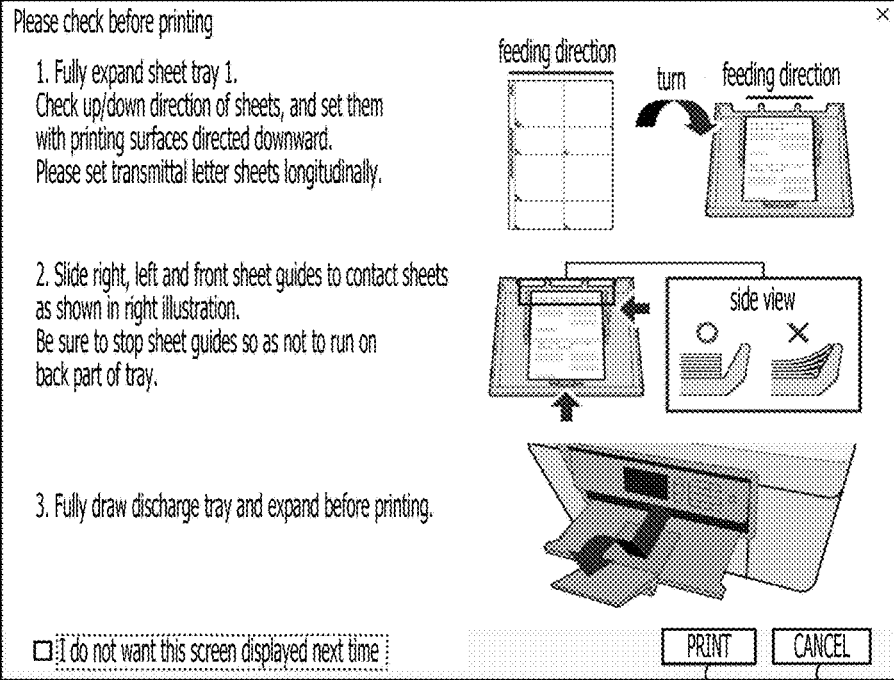
FIG. 7A shows an example of a first display screen.
Figure 7B:
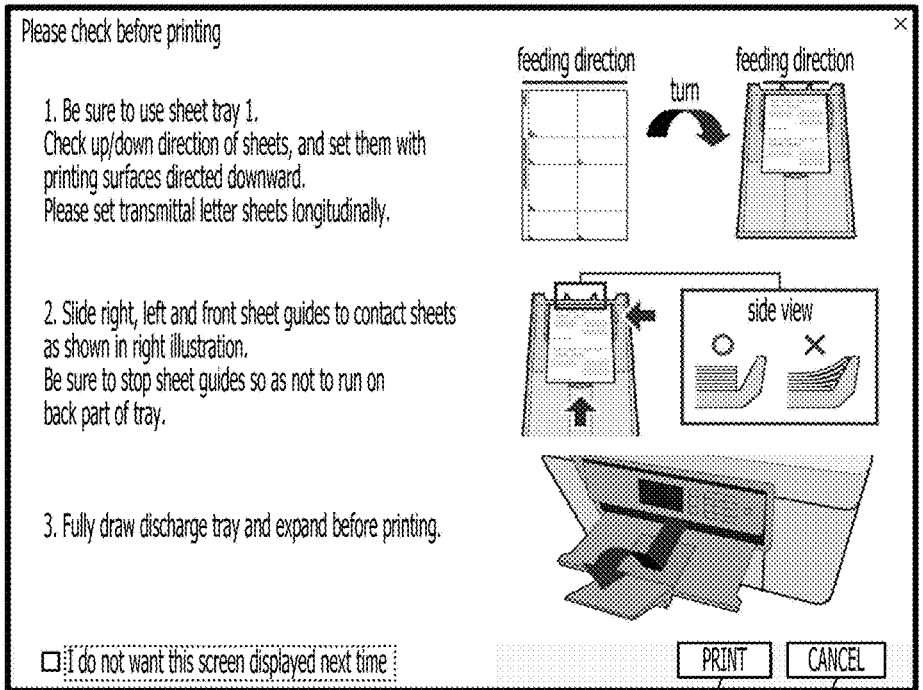
FIG. 7B shows an example of a second display screen.
Figure 8A:
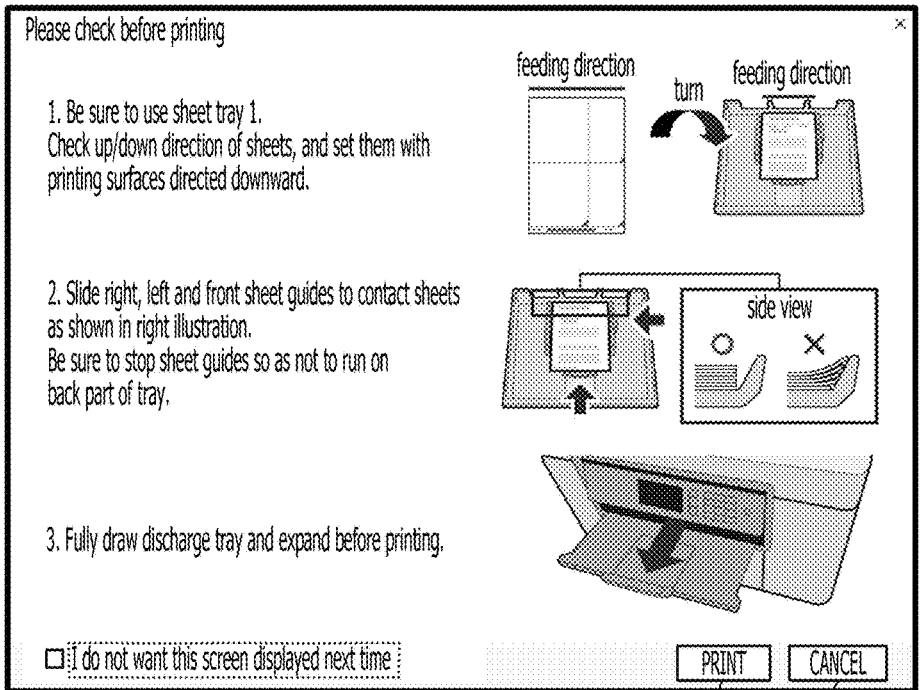
FIG. 8A shows an example of a third display screen.

In the example shown in FIG. 7A, the first character string is "1. Fully expand sheet tray 1. Check up/down direction of sheets, and set them with printing surfaces directed downward. Please set transmittal letter sheets longitudinally." The second character string is "2. Slide right, left and front sheet guides to contact sheets as shown in right illustration. Be sure to stop sheet guides so as not to run on back part of tray." The third character string is "3. Fully draw discharge tray and expand before printing." As shown in FIG. 7B, the fourth character string is "1. Be sure to use sheet tray 1. Check up/down direction of sheets, and set them with printing surfaces directed downward. Please set transmittal letter sheets longitudinally." As shown in FIG. 8A, the fifth character string is "3. Fully draw discharge tray and expand before printing."

The first character string is associated with the object names "OBJECT f," "OBJECT h," "OBJECT i," "OBJECT k" AND "OBJECT n" shown in FIG. 3A. In other words, the first character string is displayed together with an image represented by one of the objects f, h, i, k and n, on the display 51 of the information processing apparatus 12.

The second character string is associated with all of the object names from "OBJECT f" to "OBJECT n" shown in FIG. 3A. It is noted that an image indicated by the character string data representing the second character string (i.e., an image of the second character string) is an example of a common image.

The third character string is associated with the object names "OBJECT f," "OBJECT g," "OBJECT i," "OBJECT j," "OBJECT k" and "OBJECT m" shown in FIG. 3A. In other words, the third character string is displayed together with an image indicated by one of the objects f, g, i, j, k and m, on the display 51 of the information processing apparatus 12.

The fourth character string is associated with the object names "OBJECT g," "OBJECT j" and "OBJECT m" shown in FIG. 3A. That is, the fourth character string is displayed together with an image indicated by one of the objects g, j and m on the display 51 of the information processing apparatus 12.

The fifth character string is associated with the object names "OBJECT h" and "OBJECT n" shown in FIG. 3A. That is, the fifth character string is displayed together with an image indicated by one of the objects h and n on the display 51 of the information processing apparatus 12.

It is noted that the first through fourth character strings associated with the object names "OBJECT f" through "OBJECT n" are examples of displaying information.

The special driver 49 includes image data associated with the object name "OBJECT p" shown in FIG. 2C in addition to the first table, the second table and the character string data. The image data associated with the object name "OBJECT p" indicates images showing a correct placing method and a wrong placing method to place a plurality of transmittal letter sheet 14 on the tray 20 in a stacked manner.

An image indicated by the object name "OBJECT p" is displayed together with an image indicated by one of the object names "OBJECT a" through "OBJECT n" on the display 51 of the information processing apparatus 12 in addition to the image indicated by one of the objects a through n.

The special driver 49 includes image data associated with the object name "OBJECT q" shown in FIG. 2D, and image data associated with the object name "OBJECT r" also shown in FIG. 2D. An image represented by image data associated with the object name "OBJECT q" indicates a part of the printer 11 showing the discharge tray 35 which is drawn out from the printer 11 with an expansion tray 36 being retracted, or folded. An image represented by image data associated with the object name "OBJECT r" indicates a part of the printer 11 showing the discharge tray 35 which is drawn out of the printer 11 with the expansion tray 36 being expanded, or unfolded.

The discharge tray 35 is slidably supported by a housing of the printer 11. The expansion tray 36 is rotatably supported by the discharge tray 35. A state of the expansion tray 36 is changed by the user between a retracted state, or a folded state where the expansion tray 36 is folded and overlaid on the discharge tray 35 and an expanded state, or an unfolded state where the expansion tray 36 is unfolded and protrudes from the discharge tray 35. The discharge tray 35 has a size capable of supporting the A5 size sheets. The discharge tray 35 with the expansion tray 36 in the unfolded state has a size capable of supporting the A4 size sheet. Thus, when printing is performed on the A4 size sheets, the expansion tray 36 is unfolded by the user so that the discharged sheets do not fall off from the discharge tray 35.

The image represented by image data associated with the object name "OBJECT q," that is, the image showing the part of printer and the expansion tray in the retracted state is displayed on the display 51 when printing is performed on the A5 size transmittal letter sheets 14. It is noted that the object name "OBJECT q" is associated with the object b and the object e which indicate the A5 size transmittal letter sheets 14. Further, the image represented by the image data associated with the object name "OBJECT q" is displayed on a third display screen (see FIG. 8A) and an eighth display screen (see FIG. 10B).

Figure 10A:
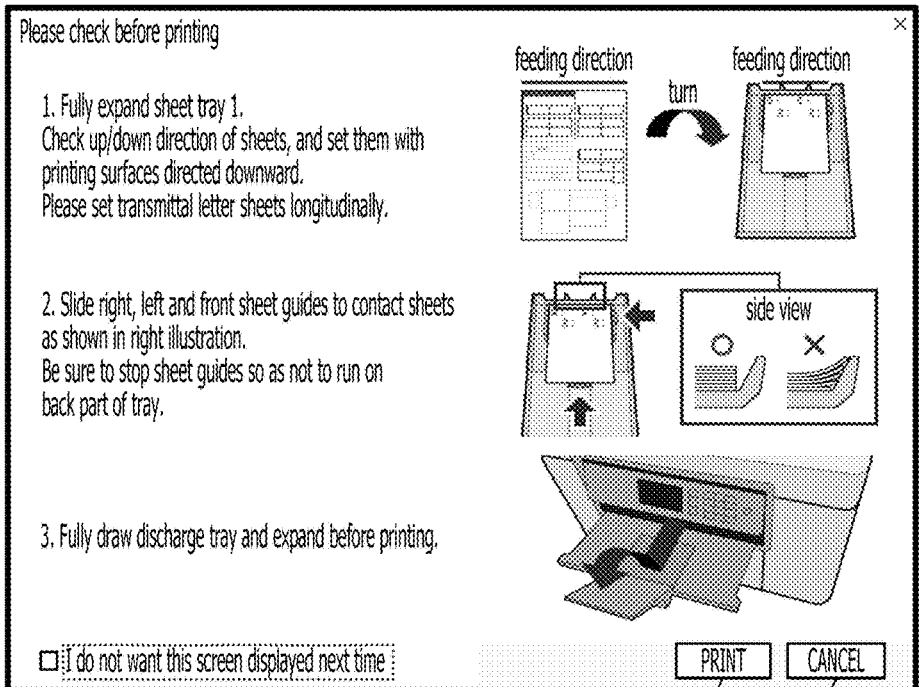
FIG. 10A shows an example of an seventh display screen.

The image represented by image data associated with the object name "OBJECT t," that is, the image showing the part of printer and the expansion tray in the unfolded state is displayed on the display 51 when printing is performed on the A4 size transmittal letter sheets 14. It is noted that the object name "OBJECT r" is associated with the objects a, c and d, which indicate the A4 size transmittal letter sheets 14. Further, the image represented by the image data associated with the object name "OBJECT r" is displayed on a first display screen (see FIG. 7A), a second display screen (see FIG. 7B), and an fourth display screen (see FIG. 8B) through a seventh display screen (FIG. 10A).

The installer 50 is a program which, when executed, installs the special driver 49 in the information processing apparatus 12.

The installer 50 includes the name of the standard driver 48 (which name will be referred to as a standard driver name) or the model name of the printer 11. The standard driver 48 is installed in the information processing apparatus 12 so as to have the model name of the printer 11. That is, the standard driver name and the model name of the printer 11 coincide with each other. In the following description, it is assumed that the installer 50 includes "MFP-A" and "MFP-B" as the standard driver names.

It is noted that the special driver 49 may include the standard driver name or the model name of the printers 11. In such a case, the installer 50 installs the special driver 49 in the information processing apparatus 12 with use of the standard driver name or the model name of the printer 11. It is noted that the standard driver name or the model name of the printer 11 is an example of standard driver identification information.

The transmittal letter generating program 56 is a program for generating character strings to be printed on the transmittal letter sheets 14. The user may download the transmittal letter generating program 56 from, for example, a web page published on the Internet by the transport firm, and install the transmittal letter generating program 56 in the information processing apparatus 12.

It is noted that the data storage area 45 stores data/information necessary to execute the OS 47, the standard driver 48, the special driver 49 and the installer 50.

It is also noted that the data storage area 46 stores the model name of the printer 11 and the port name in an associated manner. Specifically, the OS 47 inputs, through the communication I/F 53, a command to the printer 11 which is connected to the information processing apparatus 12 through the communication cable 13, and obtains, through the communication I/F 53, the MIB information including the model name 11 from the printer 11. The OS 47 stores the received model name and the port name in the data storage area 46 in an associated manner.

When the printer 11 and the information processing apparatus 12 are connected with the USB cable, a name determined by the OS 47 (e.g., "USB001") is used as the port name. When the printer 11 and the information processing apparatus 12 are connected with the LAN cable or through the wireless LAN, the IP address of the printer 11 is used as the port name, for example. The OS 47 installs the standard driver 48 in accordance with the model name and the port name which are associated with each other. It is noted that the port name is an example of the port identification information.

The OS 47 displays, for example, the model name of the printer 11 as the standard driver name on the display 51. Further, the OS 47 displays a list of names of the installed printer drivers on the display 51 in response to, for example, receipt of a print instruction from a document creating program, a drawing program or the like. Then, in response to receipt of a user operation to select the standard driver name through the user I/F 52, the OS 47 starts up the standard driver 48. It is noted that the data storage area 46 which stores the model name of the printer 11 and the port name in an associated manner is so-called a registry.

Hereinafter, an installing process in which the installer 50 installs the special driver 49 in the information processing apparatus 12 (see FIG. 4), and a transmission process in which the special driver 49 transmits the print data to the printer 11 (see FIG. 5) will be described.

Figure 4:
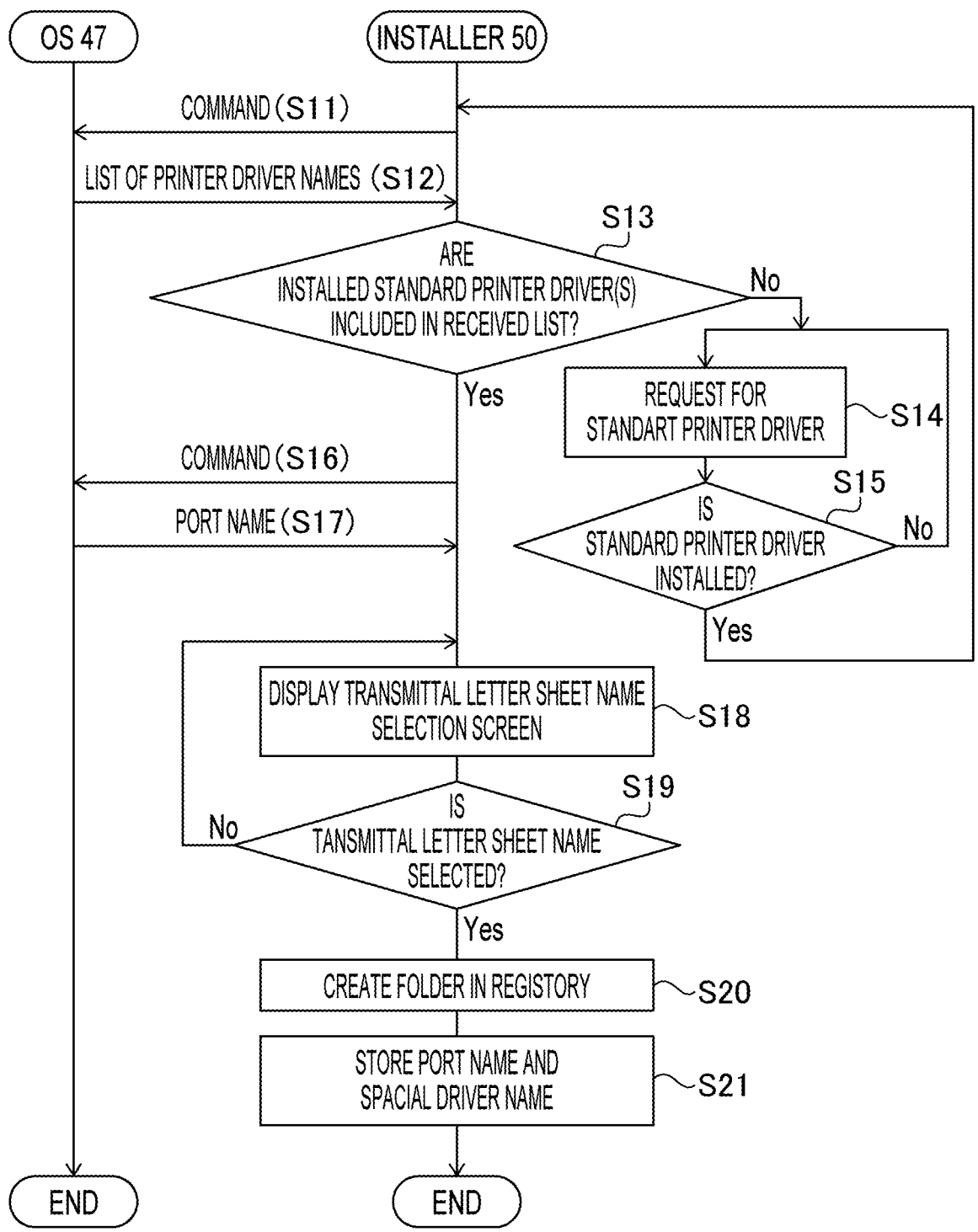
FIG. 4 illustrates processes performed by an installer.

When the installer 50 is started by the OS 47, as shown in FIG. 4, the installer 50 input a command requesting for names (hereinafter, referred to as printer driver names) of all the printer drivers installed in the information processing apparatus 12 to the OS 47 (S11). Then, the installer 50 obtains (i.e., receives) the list of the printer driver names from the OS 47 (S12). The process in S12 where the installer 50 obtains the list of the printer driver names is an example of a connected printer information obtaining process, an obtaining process and an obtaining step.

Then, the installer 50 determines whether the obtained list of printer driver names includes a printer driver having a name coinciding with at least one of the standard driver names "MFP-A" and "MFP-B" which the installer already has (S13). That is, the installer 50 determines whether the printer driver name, which coincides with one of the standard printer drivers 48 having been installed in the information processing apparatus 12, is included in the obtained list (S13).

When the installer 50 determines that the standard driver (s) 48 having been installed in the information processing apparatus 12 is included in the obtained list (S13: YES), the installer 50 inputs a command to the OS 47 (S16). The command input by the installer 50 to the OS 47 includes the standard driver name(s) as supplementary information. That is, the installer 50 uses a printer driver name which is one of the "MFP-A" and "MFP-B" the installer has and included in the list of the obtained printer driver names as the supplementary information. It is noted that, when both the "MFP-A" and "MFP-B", which the installer 50 includes, are included in the list of the obtained printer driver names, the installer 50 may display a screen encouraging the user to select one of the "MFP-A" and "MFP-B" on the display 51 of the information processing apparatus 12 as a pop-up window. In such a case, the installer 50 may use the selected one of the standard driver names as the supplementary information and adds the same to the command to be input to the OS 47.

In response to receipt of the command, the OS 47 returns a port name associated with the standard driver name indicated by the supplementary information of the received command to the installer 50 (S17). As mentioned above, when the standard driver 48 was installed, the OS 47 stored the standard driver name and the port name in the memory 43 in an associated manner.

As described above, in S17, the installer 50 receives the port name. That is, the installer 50 obtains the port name associated with the standard driver 48 which has already been installed in the information processing apparatus 12. It is noted that the installer 50 may be configured to obtain the port name by reading the memory 43 to retrieve the port name which is stored in association with the standard driver name, not via the OS 47.

Figure 6A:
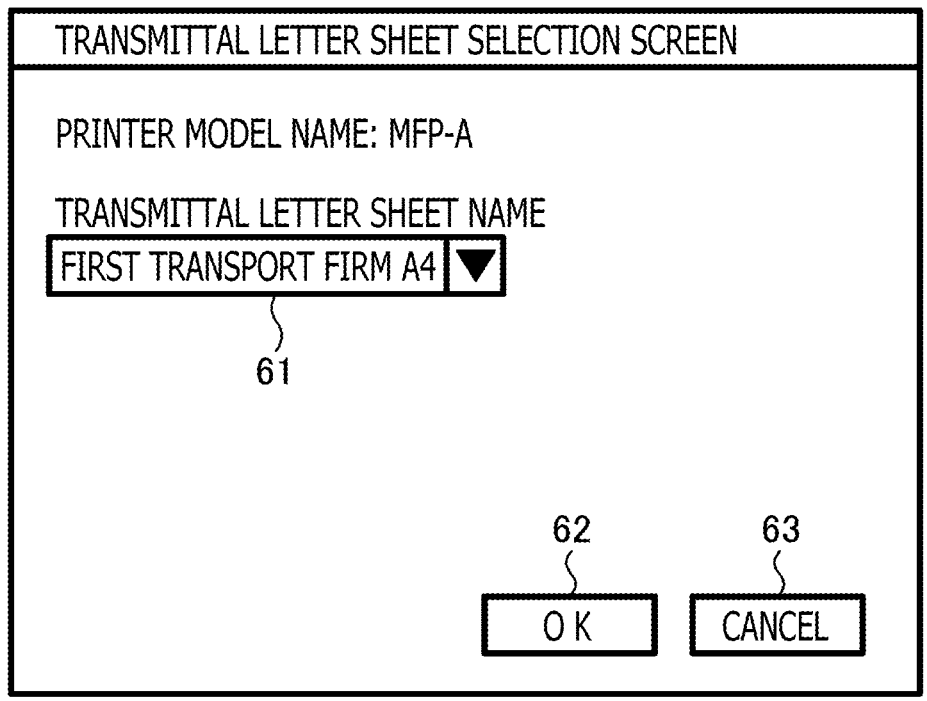
FIG. 6A shows an example of a transmittal letter sheet name selection screen.

Next, the installer 50 displays a transmittal letter sheet name selection screen on the display 51 of the information processing apparatus 12. The transmittal letter sheet name selection screen is displayed as, for example, a screen displayed in a pop-window on the display 51. FIG. 6A shows an example of the transmittal letter sheet name selection screen.

In the example shown in FIG. 6A, the transmittal letter sheet name selection screen includes a character string "PRINTER MODEL NAME: MFP-A" which indicates the model name of the printer 11 connected to the information processing apparatus 12, a character string "TRANSMITTAL LETTER SHEET NAME", a pulldown menu 61, an "OK" icon 62 and a "CANCEL" icon 63. According to the present embodiment, with use of the pulldown menu 61, any of "FIRST TRANSPORT FIRM A4," "FIRST TRANSPORT FIRM A5," "FIRST TRANSPORT FIRM YesA4," "SECOND TRANSPORT FIRM A4," AND "SECOND TRANSPORT FIRM A5" can be selected. According to the present embodiment, the standard driver 48 of which name is "MFP-A" has already been installed in the information processing apparatus 12, and FIG. 6A shows a state where the transmittal letter sheet of "FIRST TRANSPORT FIRM A4" is currently selected by the user.

As shown in FIG. 4, the installer 50 determines whether the user has selected the transmittal letter sheet name and further selected the "OK" icon 62 in the transmittal letter sheet name selection screen (S19). That is, the installer 50 determines whether the user has selected the transmittal letter sheet name. It is noted that the installer 50 keeps displaying the transmittal letter sheet name selection screen on the display 51 until the user has determined the transmittal letter sheet name. In response to the user selecting the "CANCEL" icon 63 on the transmittal letter sheet name selection screen, the installer 50 terminates, for example, installation of the special driver 49 in the information processing apparatus 12.

When it is determined that the user has determined the transmittal latter name (S19: YES), the installer 50 creates a folder in a registry of the memory 43 (S20). Then, the installer 50 stores, in the created folder, a name of the special driver 49 (hereinafter, referred to as a special driver name), the port name and the standard driver name (i.e., the model name of the printer 11) (S21). That is, the installer 50 stores the special driver name, the port name and the standard driver name in the memory 43 in an associated manner.

According to the embodiment, the special driver name is set to be the same as the transmittal letter sheet name. Thus, the special driver name is, for example, "FIRST TRANSPORT FIRM A4," "FIRST TRANSPORT FIRM A5," "SECOND TRANSPORT FIRM A4," "SECOND TRANSPORT FIRM A5" or the like. It is noted that, according to the embodiment, the name of the folder created in S20 is set to be a combination of the special driver name and the standard driver name. For example, the name of the folder is "FIRST TRANSPORT FIRM A4 MFP-A," "FIRST TRANSPORT FIRM A5 MFP-B," "SECOND TRANSPORT FIRM A4 MFP-A," "SECOND TRANSPORT FIRM A5 MFP-B" or the like.

It is noted that a process that the installer 50 receives the user operation to select the transmittal letter sheet name (i.e., determination of YES in S19) is an example of a receiving process and a receiving step. A process in S21 where the installer 50 stores the special driver name, the port name and the standard driver name in the memory 43 is an example of a storing process and a storing step.

When the OS 47 displays the list of the printer drivers on the display 51 and receives the user's operation to select one of the printer drivers, as the names indicated in the list, the combinations of the special driver name and the standard driver name, which are stored in the folders in S21, are displayed. For example, the names "FIRST TRANSPORT FIRM A4 MFP-A," "FIRST TRANSPORT FIRM A5 MFP-B," "SECOND TRANSPORT FIRM A4 MFP-A," "SECOND TRANSPORT FIRM A5 MFP-B" and the like are displayed on the display 51.

Since the special driver name includes the transmittal letter sheet name (e.g., "FIRST TRANSPORT FIRM A4"), the user can easily distinguish the special driver 49 from the standard driver 48 or the other printer drivers.

When it is determined that no standard driver 48 is installed in the information processing apparatus 12 (S13: NO), the installer 50 requests the user to install the standard driver 48 in the information processing apparatus 12. For example, the installer 50 displays a popup window requesting the user to install the standard driver 48 in the information processing apparatus 12 on the display 51 of the information processing apparatus 12. The popup window includes an "OK" icon. The user selects the "OK" icon after installing the standard driver 48 in the information processing apparatus 12.

In S15, the installer 50 determines whether the standard driver 48 has been installed in the information processing apparatus 12. For example, the installer 50 determines whether the "OK" icon in the popup window has been tapped. The installer 50 keeps displaying the popup window on the display 50 of the information processing apparatus 12 (S15: NO) until the standard driver 48 is installed in the information processing apparatus 12. When it is determined that the standard driver 48 has been installed in the information processing apparatus 12 (S15: YES), the installer 50 executes processes of S11 onwards.

As described above, the special driver 49 is installed in correspondence with the model name (i.e., the standard driver name) indicating the model of the printer 11 connected with the information processing apparatus 12 and the transmittal name selected by the user. The special driver 49 includes the print setting corresponding to the model name subjected to installation and the transmittal letter sheet name.

Next, processes performed by the special driver 49 when printing is performed on the transmittal letter sheets 14 by the special driver installed in the information processing apparatus 12 will be described, referring to FIG. 5.

The user starts up the transmittal letter generating program 56 and generates character strings to be printed on the transmittal letter sheets 14. Then, the user inputs a print instruction to the transmittal letter generating program 56 by selecting the "PRINT" icon which is displayed, by the transmittal letter generating program 56, on the display 51.

Although not shown in the flowchart, in response to receipt of the print instruction, the transmittal letter generating program 56 inputs the command in the OS 47 to cause the OS 47 to display the selection screen to select the printer driver installed in the information processing apparatus 12 on the display 51. The selection screen displays, for example, a list of names of all the printer drivers installed in the information processing apparatus 12. Then, the user selects, from among the printer driver names displayed as a list, the special driver name. For example, the user may select the special driver name "FIRST TRANSPORT FIRM A4 MFP-A" in the list. Thereafter, the user selects the "OK" icon displayed on the selection screen (S32).

Although not shown in the flowcharts, in response to the user's selection of the special driver name, the OS 47 starts up the special driver 49.

When the special driver 49 is started by the OS 47 (S33), the special driver 49 outputs the print image data to the display 51 of the information processing apparatus 12 (S34) so that the print image is displayed on the display 51 (S35). A process of S34 in which the special driver 49 outputs the print image data is an example of a first displaying process.

Figure 6B:
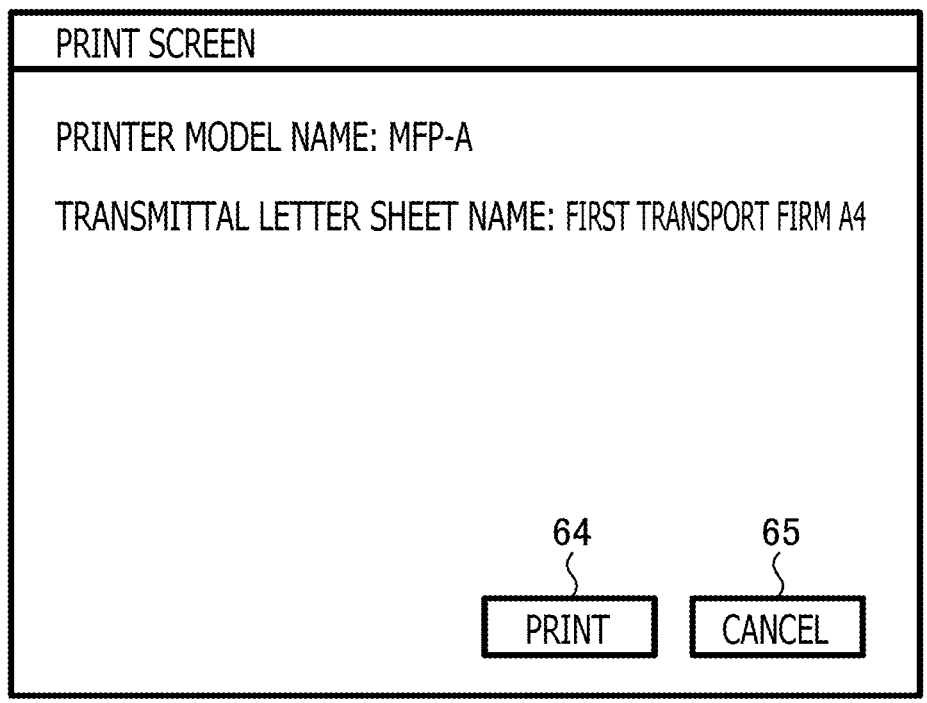
FIG. 6B shows an example of a print screen.

FIG. 6B shows an example of the print screen which is displayed on the display 51. The print screen shows, for example, the character string indicating the model name of the printer 11 (e.g., "PRINTER MODEL NAME: MFP-A"), the transmittal letter sheet name (e.g., "TRANSMITTAL LETTER SHEET NAME: FIRST TRANSPORT FIRM A4"), the "PRINT" icon 64 and the "CANCEL" icon 65. It is noted that the "PRINT" icon 54 is an example of a print execution object.

Figure 5:
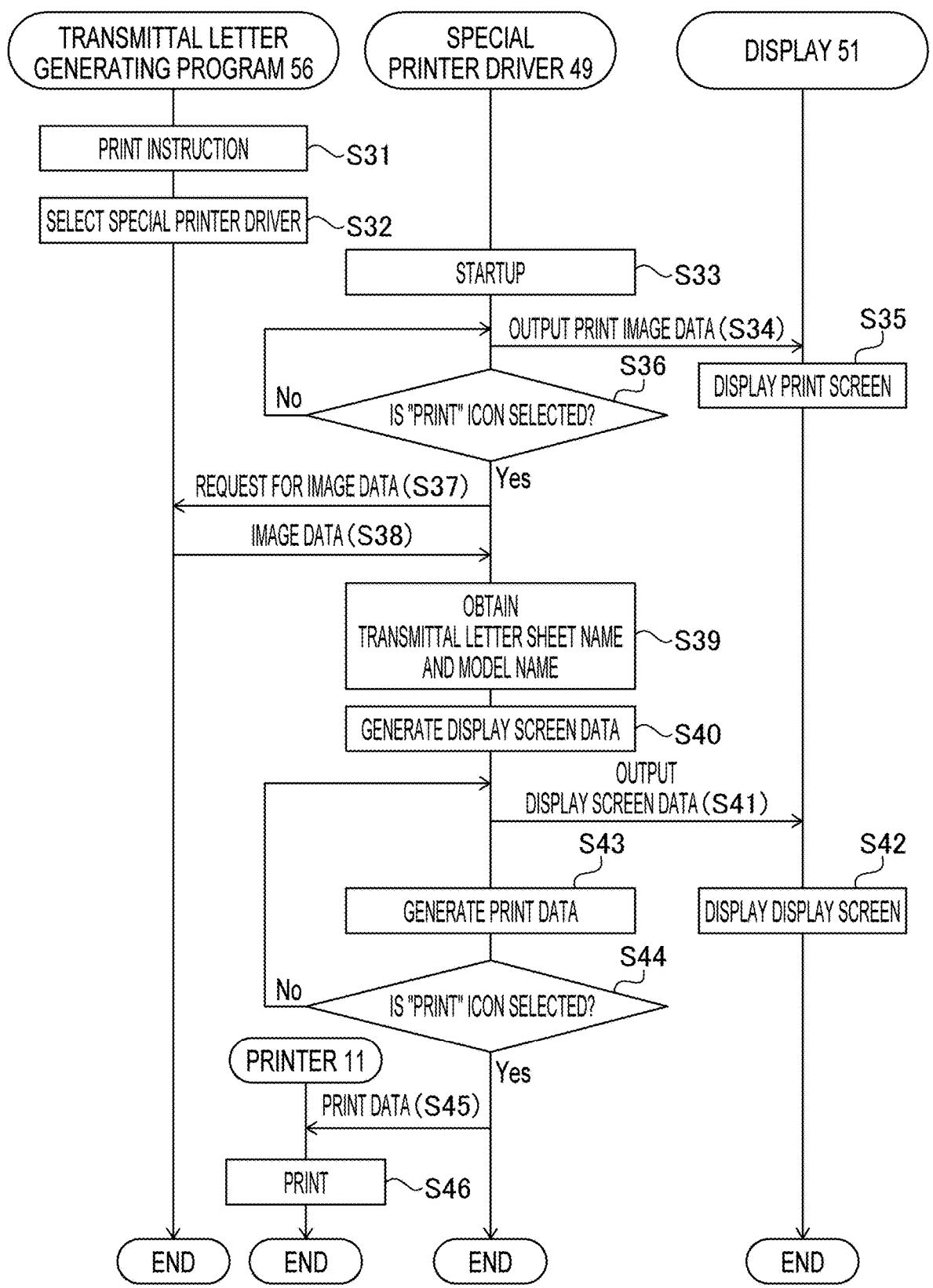
FIG. 5 illustrates processes performed by a special driver.

As shown in FIG. 5, the special driver 49 determines whether the "PRINT" icon 64 is selected in the print screen (S36). The special driver 49 keeps displaying (S36: NO) the print screen on the display 51 until the "PRINT" icon 64 is selected. Although not shown in the flowchart, when it is determined that the "CANCEL" icon 65 on the print screen is selected, the special driver 49 skips the following steps and terminates the process shown in FIG. 5.

When it is determined that the "PRINT" icon 64 has been selected in the print screen (S36: YES), the special driver 49 requests, directly or through the OS 47, the transmittal letter generating program 56 for the image data (S37). It is noted that a process of the special driver 49 to receive a user operation to select the "PRINT" icon 64 (i.e., "S36: YES") is an example of a first receiving process.

In response to receipt of the request for the image data (S37), the transmittal letter generating program 56 delivers the image data indicating the character strings to be printed on the transmittal letter sheet 14 to the special driver 49 (S38).

The special driver 49 obtains the image data from the transmittal letter generating program 56 (S38). It is noted that the process of S38 where the special driver 49 obtains the image data is an example of an image data obtaining process and an image data obtaining step.

After requesting the transmittal letter generating program 56 for the image data (S37), the special driver 49 retrieves the special driver name and the standard driver name, which were stored in S21 (see FIG. 4) from the memory 43 (S39). As described above, the special driver name is the same as the transmittal letter sheet name, and the standard driver name is the same as the model name of the printer 11. Therefore, the special driver 49 obtains the transmittal letter sheet name and the model name of the printer 11. It is noted that the process of S39 where the special driver 49 obtains the transmittal letter sheet name and the model name is an example of an obtaining process.

In S40, the special driver 49 generates display screen data representing the display screens (see FIGS. 7A-10B) to be displayed on the display 51 of the information processing apparatus 12 based on the transmittal letter sheet names and the model names obtained in S39.

Specifically, the special driver 49 selects an object name corresponding to the obtained transmittal letter sheet name from the first table (see FIG. 2A) and an object name corresponding to the obtained transmittal letter sheet name and the model name from the second table (see FIG. 3A). Further, the special driver 49 obtains, from the object names "OBJECT q" and "OBJECT r," one that corresponds to the obtained transmittal letter sheet name. Then, the special driver 49 generates the display screen data representing the display screens shown in FIGS. 7A-10B with use of image data corresponding to the object name selected from the first table, image data and character string data corresponding to the object name selected from the second table, image data indicated by the object p (see FIG. 2C), and selected one of the objects q and r. It is noted that the image data indicated by the object name corresponding to the obtained transmittal letter sheet name and the model name is an example of determination display information. A process that the special driver 49 selects an object name corresponding to the obtained transmittal letter sheet name and the model name from the second table (see FIG. 4A) is an example of a determining process and a determining step.

Concretely, in response to selection of "OBJECT a" from the first table (see FIG. 2A), "OBJECT f" from the second table (see FIG. 3A), and selection of "OBJECT r" (see FIG. 2D), the special driver 49 generates the display image data representing the first display screen shown in FIG. 7A.

In response to selection of "OBJECT a" from the first table, "OBJECT g" from the second table, and selection of "OBJECT r", the special driver 49 generates the display image data representing the second display screen shown in FIG. 7B.

In response to selection of "OBJECT b" from the first table, "OBJECT h" from the second table, and selection of "OBJECT q", the special driver 49 generates the display image data representing the third display screen shown in FIG. 8A.

Figure 8B:
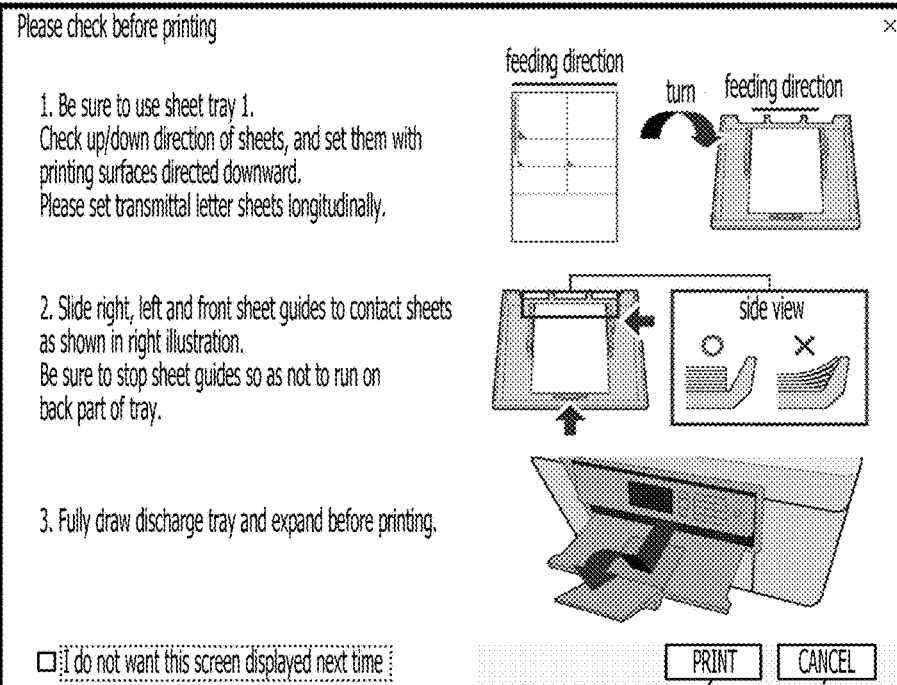
FIG. 8B shows an example of a fourth display screen.

In response to selection of "OBJECT c" from the first table, "OBJECT i" from the second table, and selection of "OBJECT r", the special driver 49 generates the display image data representing the fourth display screen shown in FIG. 8B.

Figure 9A:
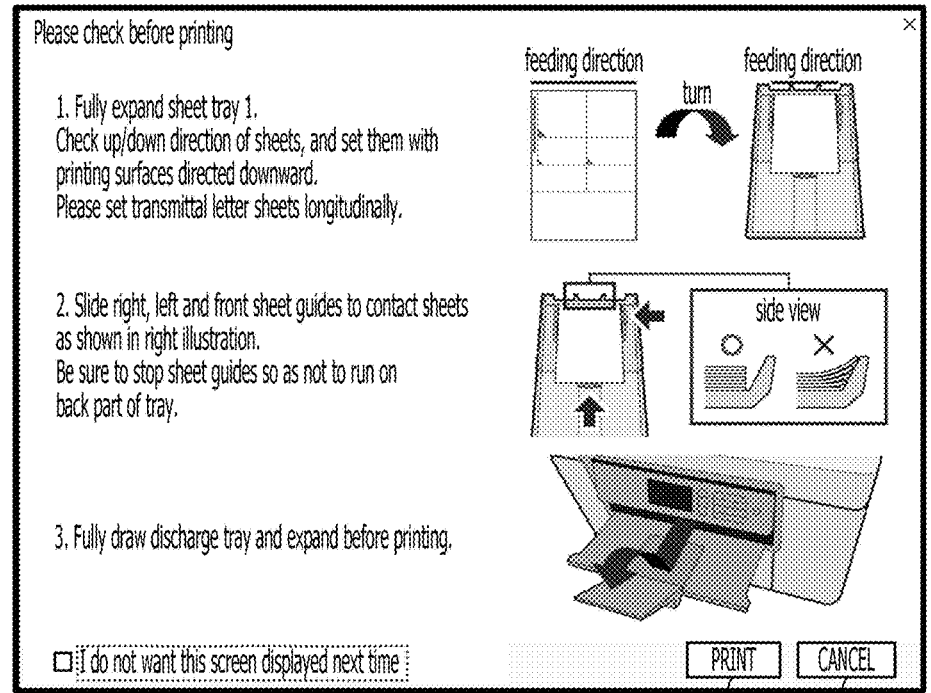
FIG. 9A shows an example of a fifth display screen.

In response to selection of "OBJECT c" from the first table, "OBJECT j" from the second table, and selection of "OBJECT r", the special driver 49 generates the display image data representing the fifth display screen shown in FIG. 9A.

Figure 9B:
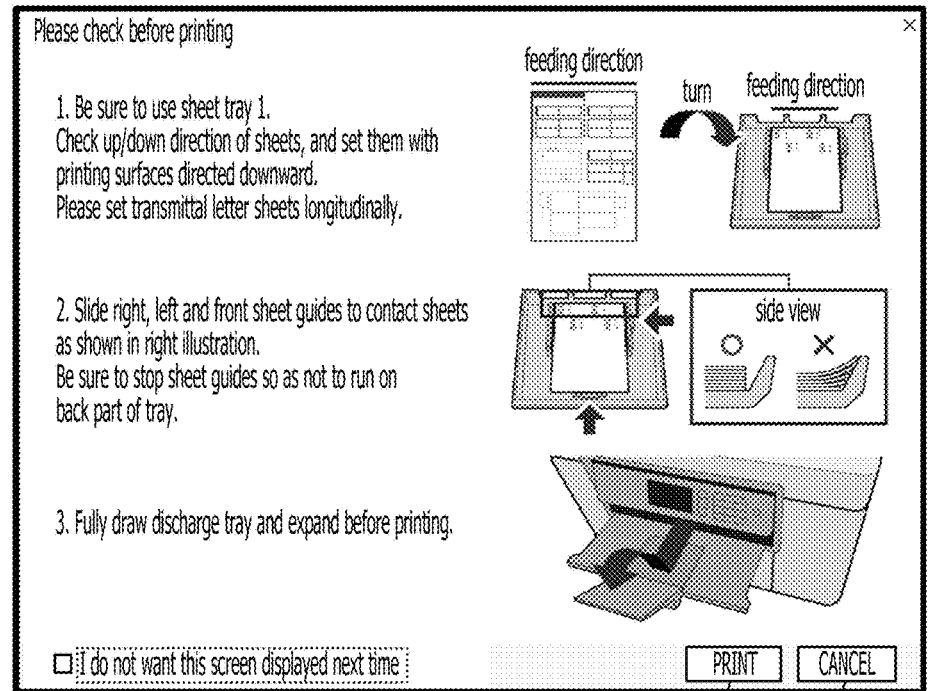
FIG. 9B shows an example of a sixth display screen.

In response to selection of "OBJECT d" from the first table, "OBJECT k" from the second table, and selection of "OBJECT r", the special driver 49 generates the display image data representing the sixth display screen shown in FIG. 9B.

In response to selection of "OBJECT d" from the first table, "OBJECT m" from the second table, and selection of "OBJECT r", the special driver 49 generates the display image data representing the seventh display screen shown in FIG. 10A.

Figure 10B:
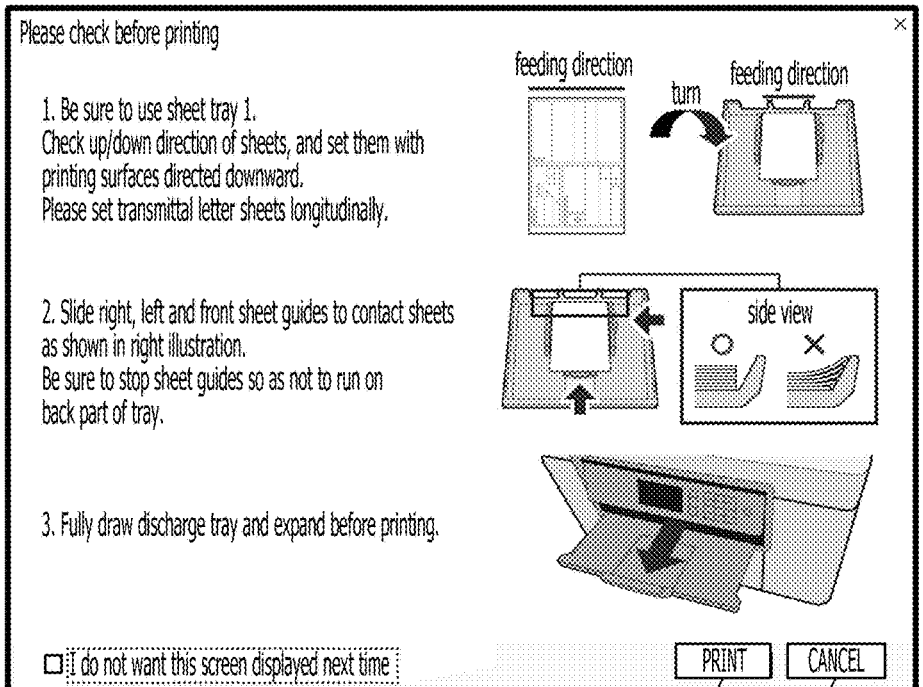
FIG. 10B shows an example of an eighth display screen.

In response to selection of "OBJECT e" from the first table, "OBJECT n" from the second table, and selection of "OBJECT q", the special driver 49 generates the display image data representing the eighth display screen shown in FIG. 10B.

As above, the special driver 49 generates the display screen data corresponding to the model name of the printer 11 subjected to installation and the transmittal letter sheet name.

Concretely, the first display screen shown in FIG. 7A is generated when the special driver 49 is installed for the model name "MFP-A" and the transmittal letter sheet name "FIRST TRANSPORT FIRM A4."

The second display screen shown in FIG. 7B is generated when the special driver 49 is installed for the model name "MFP-B" and the transmittal letter sheet name "FIRST TRANSPORT FIRM A4."

The third display screen shown in FIG. 8A is generated when the special driver 49 is installed for the model name "NIFP-A" and the transmittal letter sheet name "FIRST TRANSPORT FIRM A5" and for the model name "MFP-B" and the transmittal letter sheet name "FIRST TRANSPORT FIRM A5."

The fourth display screen shown in FIG. 8B is generated when the special driver 49 is installed for the model name "MFP-A" and the transmittal letter sheet name "FIRST TRANSPORT FIRM YesA4."

The fifth display screen shown in FIG. 9A is generated when the special driver 49 is installed for the model name "MFP-B" and the transmittal letter sheet name "FIRST TRANSPORT FIRM YesA4."

The sixth display screen shown in FIG. 9B is generated when the special driver 49 is installed for the model name "MFP-A" and the transmittal letter sheet name "SECOND TRANSPORT FIRM A4."

The seventh display screen shown in FIG. 10A is generated when the special driver 49 is installed for the model name "MFP-B" and the transmittal letter sheet name "SECOND TRANSPORT FIRM YesA4."

The eighth display screen shown in FIG. 10B is generated when the special driver 49 is installed for the model name "MFP-A" and the transmittal letter sheet name "SECOND TRANSPORT FIRM A5" and for the model name "NIFP-B" and the transmittal letter sheet name "SECOND TRANSPORT FIRM A5."

Each of the first through eighth screens shown in FIGS. 7A-10B includes the "PRINT" icon 66 and the "CANCEL" icon 67. The special driver 49 receives a user selection of the "PRINT" icon 66 in S44 (see FIG. 5). It is noted that the "PRINT" icon 66 is an example of a print execution object.

As shown in FIG. 5, the special driver 49 outputs the generated display screen data to the display 51 of the information processing apparatus 12 (S41), and the display 51 displays the display screen represented by the generated display screen data as received (S42). The display screen is displayed, for example, as a popup window displayed on the display 51.

The process in S41 where the special driver 49 outputs the display screen data is an example of a display information outputting process and a display information outputting step. Further, the processes in S41 and S42 where the special driver 49 outputs the display screen data and the display 51 displays the display screen based on the display screen data are examples of a second displaying process and a third displaying process.

The special driver 49 performs processes of generating the display screen data and displaying the display screens on the display 51 (S39-S41). The special driver 49 further performs, in S43, a process of generating print data based on the image data obtained in S38. Then, the special drive 49 receives the user selection of the "PRINT" icon 66 displayed on the display screen (S44). It is noted that the process in S43 where the special drive 49 generates the print data is an example of a generating process and a generating step. The process in S44 where the special driver 49 receives the user selection of the "PRINT" icon 66 is an example of a second receiving process.

Until the special driver 49 receives the user selection of the "PRINT" icon 66 (S44: NO), the special driver 49 keeps displaying the display screen on the display 51. In response to receipt of the user selection of the "PRINT" icon 66 (S44: YES), the special driver 49 transmits, through the communication I/F 53, the print data generated in S43 to the printer 11 directly or by way of the OS 47 (S45). It is noted that, when the user selects the "PRINT" icon 66 (S44: YES), display of the display screen on the display 51 of the information processing apparatus 12 is terminated. Specifically, in response to the user selection of the "PRINT" icon 66, the popup window displayed on the display 51 is closed. It is noted that the process in S45, in which the special driver 49 outputs the print data, is an example of a print data outputting process and a print data outputting step.

Upon receipt of the print data through the communication I/F 33 (S45), the printer 11 performs printing of the received print data on the transmittal letter sheet 14 (S46).

According to the above-described embodiment, the special driver 49 is installed for the model name (i.e., the standard driver name) indicating the model of the printer 11 connected with the information processing apparatus 12 and the transmittal letter sheet name selected by the user. The special driver 49 has the print setting corresponding to the model name of the printer 11 subjected to the installation and the transmittal letter sheet name. Accordingly, the user can perform printing of the print data on the transmittal letter sheet 14 without performing various operations including an operation to designate the sheet size, an operation to set the margin size, an operation to designate a one-side or both-side printing and the like, but simply by selecting a special driver name from among the list of the special driver names.

According to the above-described embodiment, the special driver 49 determines the display screen (see FIGS. 7A-10B) to be displayed based on the model name of the printer 11 subjected to installation and the type of the transmittal letter sheet, and outputs the determined display screen to the display 51 for display. The display image includes, for example, an image indicating that the tray 20B is to be in the retracted state, an image indicating that the tray 20B is to be in the expanded state, an image indicating a position of the transmittal letter sheets 14 on the tray 20, an image indicating an orientation, in the horizontal direction, of the transmittal letter sheets on the tray 20, an image indicating whether the transmittal letter sheets 14 are placed face-up or face-down on the tray 20. Therefore, the special driver 49 is capable of making the user visually recognize information regarding handling of the tray 20 and the transmittal letter sheets 14. As a result, the special driver 49 enables the user to easily set the print setting. Further, the special driver 49 make the user easily recognize operations to be performed on the printer 11 side to perform printing.

According to the above-described embodiment, after the image data is obtained (S38) and before the print data is output (S45), the display screen is displayed on the display 51 of the information processing apparatus 12 (S42). Therefore, the user can visually recognize the display information before printing is performed by the printer 11. Further, the user can visually recognize the display screen when the print data is being generated.

According to the above-described embodiment, after the special driver 49 causes the display 51 of the information processing apparatus 12 to display the display screen, the special driver 49 receives the user operation of selecting the "PRINT" icon 66 and outputs the print data to the printer 11. Accordingly, it is ensured that the special driver 49 makes the user visually recognize the display screen before the printer 11 performs printing.

Further, according to the above-described embodiment, the image(s) displayed on the display screen shows the position of the transmittal letter sheets 14 on the tray 20, the orientation, in the horizontal direction, of the transmittal letter sheets 14 on the tray 20, whether the transmittal letter sheets 14 are placed face-up or face-down on the tray, and the like. Therefore, the special driver 49 makes the user easily recognize where on the tray the transmittal latter sheets 14 are to be placed, in which orientation, in the horizontal direction, the transmittal letter sheets 14 are directed on the tray 20 and whether the transmittal letter sheets 14 are to be placed face-up or face-down on the tray 20. As a result, occurrence of a jam of the transmittal letter sheets 14 and/or wasting of the transmittal letter sheets 14 as printing is not performed appropriately due to user's placement of the transmittal letter sheets 14 on the tray at a wrong position, in a wrong orientation, or in a reversed manner in terms of the face-up/face-down state.

According to the above-described embodiment, with use of the display screen, a relationship between the tray 20 and the transmittal letter sheets 14 are indicated with an image. Therefore, in comparison with a case where such a relationship is indicated in writing, the special driver 49 makes the user easily recognize the relationship therebetween.

Further, according to the above-described embodiment, the image displayed on the display screen shows a state where the tray 20B is in the retracted state or in the expanded state. Therefore, the image makes the user easily recognize handling of the tray 20 necessary for the printer 11 to perform printing on the transmittal letter sheet 14.

According to the above-described embodiment, the special driver 49 includes the image data which is commonly used for all the display screens and indicated by the "OBJECT p," the second character string which is commonly used for all the display screens, and the image data and the character data corresponding to the model name of the printer 11 subjected to installation and the type of the transmittal letter sheets and indicated by the "OBJECT f" through "OBJECT n" and generates a display screen corresponding to the model name of the printer 11 subjected to installation and the type of the transmittal letter sheets 14. Accordingly, in comparison with a case where the special driver 49 includes all the display images shown in FIGS. 7A-10B and selects one of them for display, the data size of the special driver 49 can be reduced.

According to the above-described embodiment, the special driver 49 includes the image data representing the transmittal letter sheets 14 (see FIG. 2B). Further, on the display screen displayed on the display 51 of the information processing apparatus 12, the image of the transmittal letter sheets 14 is included. Therefore, it is suppressed that occurrence of a jam due to usage of wrong transmittal letter sheets 14 or waste of the wrong transmittal letter sheets 14.

According to the above-described embodiment, the special driver 49 is installed for the printer 11 and the port associated with the standard driver 48 having been installed in the information processing apparatus 12, which will save the user a log of troublesome operations in selecting the printer 11 or the port at the time of installing the special driver 49.

According to the above-described embodiment, the special driver 49 is indicated on the display 51 of the information processing apparatus 12 by the type of the transmittal letter sheet 14 and the standard driver name (i.e., the model name of the printer 11) such as "FIRST TRANSPORT FIMR A4 MFP-A," "SECOND TRANSPORT FIRM MFP-B" and the like.

Therefore, the special driver 49 makes the user easily recognize the special printer driver to be selected such that the special printer driver to be selected is clearly distinguished from the others by the type of the transmittal letter sheet 14 and the standard driver name.

Modifications

According to the above-described embodiment, the special driver 49 includes the image data which is commonly used for all the display screens and indicated by the "OBJECT p," the second character string which is commonly used for all the display screens, and the image data and the character data corresponding to the model name of the printer 11 subjected to installation and the type of the transmittal letter sheets 14 and indicated by the "OBJECT f" through "OBJECT n." It is noted that, instead of the above configuration, the special driver 49 may have eight pieces of image data representing the first display screen through the eighth display screen shown in FIGS. 7A-10B, respectively.

According to the above-described embodiment, in response to startup (of the special driver 49), the special driver 49 obtains the model name of the printer 11 subjected to installation and the type of the transmittal letter sheet 14 from the memory 43, and generates and outputs the display screens (see FIGS. 7A-10B) based on the obtained model name of the printer 11 and the type of the transmittal letter sheet 14. It is noted that, instead of the above configuration, the display screens which are to be output by the special driver 49 may be stored in the memory 43 when the special driver 49 is installed. Specifically, in such a modified configuration, the installer 50 may generate the display screens, as in S40, based on the model name of the printer 11 subjected to installation and the type of the transmittal letter sheet 14 selected by the user. Then, the installer 50 stores the thus generated display screens in the memory 43. The special driver 49 may perform a process of retrieving the display screens from the memory 43 instead of the processes in S39 and S40 in FIG. 5. Further, the special driver 49 may output the display screens read out from the memory 43 to the display 51 of the information processing apparatus 12.

In the above-described embodiment, as an example of the sheet, the transmittal letter sheet 14 is referred to. It is note that the sheets may be other sheets such as post cards, greeting cards and the like.

In the above-described embodiment, as an example of the sheet, the transmittal letter sheet 14, which has the adhesion layer and the release layer, is referred to. It is noted that the sheet need not be limited to such a sheet, but the sheet may be, for example, another type of transmittal letter sheet which only have a printing layer.

In the above-described embodiment, the display screen is displayed on the display 51 of the information processing apparatus 12. Optionally, the display screens may be displayed on the display 31 of the printer 11 in addition to the display 51. In such a case, the special driver 49 outputs the display screen data generated in S40 to both the display 51 and the printer 11. Alternatively, the display screens may be displayed on the display 31 of the printer 11 instead of the display 51 of the information processing apparatus 12. In such a case, the special driver 49 outputs the display screen data generated in S40 only to the printer 11.

In the above-described embodiment, it is described that, when the standard drier 48 has not yet installed in the information processing apparatus 12 at the time of installation of the special driver 49, the user is requested to install the standard driver 48 in the information processing device 12. That is, in the above-described embodiment, it is described that the standard driver 48 having been installed in the information processing apparatus 12 is a necessary condition for installing the special driver 49 in the information processing apparatus 12.

According to a modification, the standard driver 48 having been installed in the information processing apparatus 12 may not be a necessary condition for installing the special driver 49 in the information processing apparatus 12. According to the modification, the special driver 49 may be installed in the information processing apparatus 12 in a manner similar to a case where the standard driver 48 is installed in the information processing apparatus 12. In such a configuration, the installer 50 may, for example, input a command requesting to return the model name of the printer 11 connected with the information processing apparatus 12 and the port name to the OS 47.

Alternatively, if the printer 11 is connected to the information processing apparatus 12 when the special driver 49 is installed, the installer 50 may input a command requesting the OS 47 to broadcast, for example, the MIB information of the printer 11 connected with the information processing apparatus 12 so that the installer can obtain the same.

Then, the installer 50 obtains the model name included in the MIB information which the OS 47 obtained from the printer 11. Then, the installer 50 displays a window indicating a list of the model names of the printers 11 connected to the information processing apparatus 12 on the display 51 of the information processing apparatus 12 so that the user can select the model name of the printer 11 subjected to installation of the special driver 49. Then, the installer 50 installs the special driver 49 for the model name selected by the user in the information processing apparatus 12.

In the embodiment above, it is described that the special driver 49 is started by the transmittal letter generating program 56 via the OS 47. This configuration may be modified such that the special driver 49 may be started directly by a user operation. The started special driver 49 receives the user operation to designate image data. It is noted that the image has been generated by the transmittal letter generating program 56 and stored in the memory 43, in advance.

According to the above-described embodiment, the special driver 49 generates the display screen data (S40) after obtaining the image data (S38). According to a modification, the special driver 49 may obtain the image data after generating the display screen data and causing the display 51 to display the display screen, or after the "PRINT" icon 66 on the display screen is selected by the user.

According to the above-described embodiment, in response to the user selection of the "PRINT" icon 66 on the display screen, the popup window displaying the display screen is closed and the print data is transmitted to the printer 11. According to a modification, the popup window showing the display screen may be closed and the print data may be transmitted to the printer 11 in response to another condition. The other condition may be, for example, the popup window showing the display screen is displayed on the display 51 for a particular time period (e.g., 15 seconds, 30 seconds, 1 minute, or the like), or particular information is transmitted from the printer 11 to the information processing apparatus 12. The particular information may be, for example, information indicating that the tray 20 has been detached from the printer 11 and then re-attached to the printer 11.

A sensor configured to detect attachment/detachment of the tray may be provided to the printer 11. In such a case, if the special driver 49 is started with the transmittal letter sheets 14 having been loaded to the printer 11 (i.e., placed on the tray), by requesting the user to detach the tray 20 from the printer 11 and then attach the tray 20 to the printer, it is possible to make the user reconfirm that the transmittal letter sheets 14 are placed on the tray 20 appropriately by re-displaying the display window on the display 51.

In the above-described embodiment, still images are displayed on the display screens (see FIGS. 7A-10B). According to a modification, movies may be displayed on the display screens. In such a case, the special driver 49 may include a plurality of movie files instead of or in addition to a plurality of pieces of image data.

According to the above-described embodiment, the "PRINT" icon 66 is included in the display screens (see FIGS. 7A-10B). According to a modification, the "PRINT" icon 66 may be included in a popup window which is popped up separately from the display screen.

What is claimed is:

1. A non-transitory computer-readable recording medium for an information processing apparatus to which a printer is connected, the recording medium storing instructions realizing a computer program to be executed by a controller of the information processing apparatus, the program including a plurality of pieces of display information associated with a plurality of pieces of printer model information respectively indicating a plurality of models of printers and a plurality of pieces of sheet type information respectively indicating a plurality of types of sheets, each of the plurality of models of printers having a tray on which the sheet is to be placed, the display information including information on handling of the tray and the sheet placed on the tray, the program being installable for any of the plurality of models of printers, the program being installed in the information processing apparatus using
one of the plurality of pieces of printer model information coinciding with connected printer information indicating a model of the printer connected to the information processing apparatus, and
one of the plurality of pieces of sheet type information selected by a user at a time of installation from among the plurality of pieces sheet type information, and the program causing, when executed by the controller, the information processing apparatus to perform
a determining process of determining, from among a plurality of pieces of display information, one piece of the plurality of pieces of display information, which is associated with the printer model information used to install the program and the sheet type information selected by the user at the time of installation and used to install the program, as determined display information to be displayed the determined display information indicating handling of the tray of the connected printer and the sheet placed on the tray,
an image data obtaining process of obtaining image data,
a display information outputting process of outputting the determined display information,
a generating process of generating print data for the connected printer to print on a sheet corresponding to the sheet type information selected by the user based on the obtained image data, and
a data outputting process of outputting the generated print data.

2. The non-transitory computer-readable recording medium according to claim 1, wherein the program causes, when executed by the controller, the information processing apparatus to perform the display information outputting process after the information processing apparatus obtains the image data and before the information processing apparatus outputs the print data.

3. The non-transitory computer-readable recording medium according to claim 1, wherein at least one of the information processing apparatus and the printer has a displaying device and an inputting device, and
wherein the program causes, when executed by the controller, the information processing apparatus to perform
a first displaying process of causing the displaying device to display a print execution object configured to receive a user operation to instruct printing,
a first receiving process of receiving the user operation of the print execution object through the inputting device,
in response to receipt of the user operation of the print execution object, a second displaying process of performing the display information outputting process to cause the displaying device to display the determination display information,
a third displaying process of displaying the print execution object configured to receive the user operation to instruct printing on the displaying device one of together with the determination display information and after execution of the second displaying process,
after the third displaying process is performed, a second receiving process of receiving the user operation to indicate execution of printing through the inputting device, and
in response to receipt of the user operation of the print execution object in the second receiving process, the print data outputting process.

4. The non-transitory computer-readable recording medium according to claim 1, wherein the display information includes:
information indicating an orientation, in the horizontal direction, of the sheet of which type is indicated by the sheet type information;
information indicating a position, on the tray, of the sheet of which type is indicated by the sheet type information; and
information indicating whether the sheet of which type is indicated by the sheet type information is placed on the tray face-up or face-down.

5. The non-transitory computer-readable recording medium according to claim 4, wherein the display information further includes a common image which is commonly when an image corresponding to any of the plurality of types of trays and a plurality of type of sheets is displayed.

6. The non-transitory computer-readable recording medium according to claim 4, wherein the display information includes a plurality of pieces of second image data respectively indicating a plurality of second images which respectively correspond to the types of the sheets indicated by the sheet type information.

7. The non-transitory computer-readable recording medium according to claim 1, wherein the display information include a plurality of pieces of first image data respectively indicating a plurality of first images, each of the plurality of first images indicating correspondence between the tray of the printer of which model is indicated by the printer model information coincides with the connected printer information and the sheet of which type is indicated by the sheet type information.

8. The non-transitory computer-readable recording medium according to claim 7, wherein a state of the tray of the printer indicated by the printer model information is changeable between a first state in which the tray supports the sheets of which type is a first type indicated by the sheet type information and a second state in which the tray supports the sheets of which type is a second type indicated by the sheet type information;
wherein the first image is an image showing that the first type of sheets are supported by the tray in the first state; and
wherein another first image is an image showing that the second type of sheets are supported by the tray in the second state.

9. The non-transitory computer-readable recording medium according to claim 1, wherein the program includes a plurality of pieces of the display information of which number is as many as a number of combinations of the printer models indicated by the printer model information and the sheet types indicated by the sheet type information; and
wherein one piece of the plurality of display information is information indicating one screen.

10. The non-transitory computer-readable recording medium according to claim 1, wherein the information processing apparatus has a memory; and
wherein the program causes, when executed by the controller, the information processing apparatus to perform an obtaining process of obtaining the printer model information and the sheet type information, which were used for installation and stored in the memory, from the memory.

11. The non-transitory computer-readable recording medium according to claim 1, wherein the information processing apparatus has a memory; and
wherein the program is installed in the information processing apparatus such that, as the sheet type information is stored in the memory provided to the information processing apparatus, installation of the program is performed using the sheet type information stored in the memory as a name of the program as installed.

12. The non-transitory computer-readable recording medium according to claim 1, wherein the information processing apparatus has a memory configured to store the connected printer information, identification information identifying a port and standard driver information indicating a standard printer driver in an associated manner; and
wherein the program is installed in the information processing apparatus such that installation is performed with reference to the printer model information which coincides with the connected printer information associated in the standard driver identification information and the port identification information associated with the standard driver identification information.

13. The non-transitory computer-readable recording medium according to claim 1, wherein, when the program is to be installed, the program is identified such that a name including the obtained standard driver identification information or the printer model information and the sheet type information is displayed on a displaying device of the information processing apparatus.

14. The non-transitory computer-readable recording medium according to claim 1, wherein the sheet type information indicates a type of the sheet having a plurality of layers including a printing layer and an adhesion layer, a release layer.

15. A non-transitory computer-readable recording medium for information processing apparatus connected to a printer, the recording medium storing instructions realizing an installer set including a program to be executed by a controller of the information processing apparatus to control the information processing apparatus and an installer configured to install the program in the information processing apparatus,
the program including a plurality of pieces of display information associated with a plurality of pieces of printer model information respectively indicating a plurality of models of printers and a plurality of pieces of sheet type information respectively indicating a plurality of types sheets, each of the plurality of models of printers having a tray on which the sheet is placed, the display information including information on handling of the tray and the sheet placed on the tray, the program being installable for any of the plurality of models of printers,
the installer causing, when executed by the controller, the information processing apparatus to perform
a receiving process of receiving a user selection to select sheet type information at a time of installation from among a plurality of pieces sheet type information,
a connected printer information obtaining process of obtaining a name of the connected printer,
a storing process of storing the sheet type information selected by the user and the printer model information coinciding with the obtained connected printer information in a memory of the information processing apparatus, and
an installation process of installing the program using the printer model information and the sheet type information stored in the memory; and
the program causing, when executed by the controller, the information processing apparatus to perform
a determining process of determining, from among a plurality of pieces of display information, display information associated with the printer model information used to install the program and the sheet type information selected by the user at the time of installation and used to install the program as determined display information to be displayed, the determined display information indicating handling of the tray of the connected printer and the sheet placed on the tray,
an image data obtaining process of obtaining image data,
a display information outputting process of outputting the determined display information,
a generating process of generating print data for the connected printer to print on a sheet corresponding to the sheet type information selected by the user based on the obtained image data, and
a data outputting process of outputting the generated print data.

16. An information processing apparatus, comprising:
an inputting device configured to receive a user operation;
a communication device;
a memory device; and
a controller,
wherein the memory device stores a plurality of pieces of display information associated with a plurality of pieces of printer model information respectively indicating a plurality of models of printers and a plurality of pieces of sheet type information respectively indicating types of sheets used in the plurality of models of printers, each of the plurality of models of printers having a tray on which sheets are to be placed, the display information being information indicating handling of the tray and the sheet placed on the tray, the program being installable for any of the plurality of models of printers,
wherein the controller is configured to perform
obtaining connected printer information indicating a model of the printer connected to the communication device,
receiving a user operation at a time of installation to select one piece of sheet type information from among a plurality of pieces of sheet type information,
storing the printer model information coinciding with the obtained connected printer information and the received sheet type information in the memory,
determining the display information associated with the printer model information used to install the program and the received sheet type information selected by the user at the time of installation and stored in the memory device as the determined display information,
obtaining image data,
a display information outputting process of outputting the determined display information, generating print data for the connected printer to print on a sheet corresponding to the sheet type information selected by the user based on the obtained image data, outputting the generated print data to the printer through the communication device, and outputting the determined display information.

17. A method for an information processing apparatus provided with an inputting device configured to receive a user operation, a communication device, a memory, wherein the memory stores a plurality of pieces of display information associated with a plurality of pieces of printer model information respectively indicating a plurality of models of printers and a plurality of pieces of sheet type information respectively indicating types of sheets used in the plurality of models of printers, wherein each of the plurality of models of printers has a tray on which sheets are to be placed, wherein the display information is information indicating handling of the tray and the sheet, and wherein the method includes:

obtaining connected printer information indicating the model of the printer connected to the communication device;

receiving a user operation at a time of installation to select one piece of sheet type information from among a plurality of pieces of sheet type information;

storing the printer model information coinciding with the obtained connected printer information used to install the program and the received sheet type information selected by the user at the time of installation in the memory;

determining the display information associated with the printer model information and the received sheet type information stored in the memory as the determined display information, the determined display information indicating handling of the tray of the connected printer and the sheet placed on the tray;

obtaining image data;

a display information outputting process outputting the determined display information;

generating print data for the connected printer to print on a sheet corresponding to the sheet type information selected by the user based on the obtained image data; and outputting the generated print data to the printer through the communication device.

\* \* \* \* \*